United States Patent
Kang

(10) Patent No.: US 11,031,984 B2
(45) Date of Patent: Jun. 8, 2021

(54) OPTIMUM BEAM DISPLAY AND GUIDANCE METHOD AND APPARATUS

(71) Applicant: Samsung Electronics Co., Ltd., Suwon-si (KR)

(72) Inventor: Youngmyoung Kang, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/481,639

(22) PCT Filed: Feb. 6, 2018

(86) PCT No.: PCT/KR2018/001566
§ 371 (c)(1),
(2) Date: Jul. 29, 2019

(87) PCT Pub. No.: WO2018/155844
PCT Pub. Date: Aug. 30, 2018

(65) Prior Publication Data
US 2020/0007209 A1  Jan. 2, 2020

(30) Foreign Application Priority Data
Feb. 21, 2017 (KR) .......................... 10-2017-0022706

(51) Int. Cl.
*H04B 7/06* (2006.01)
*H04B 17/23* (2015.01)
(Continued)

(52) U.S. Cl.
CPC ......... *H04B 7/0617* (2013.01); *H04B 7/0408* (2013.01); *H04B 7/0413* (2013.01); *H04B 17/23* (2015.01); *H04B 17/318* (2015.01)

(58) Field of Classification Search
CPC .... H04B 7/0617; H04B 17/23; H04B 17/318; H04B 7/0408; H04B 7/0413; H04B 7/088;
(Continued)

(56) References Cited

U.S. PATENT DOCUMENTS 5,771,449 A * 6/1998 Blasing .................. H01Q 1/246
                                                                  348/E7.07
6,249,247 B1   6/2001 Inugai et al.
(Continued)

FOREIGN PATENT DOCUMENTS

| EP | 1 458 123 A1 | 9/2004 |
| EP | 2 540 065 A1 | 1/2013 |
| EP | 3 416 301 A1 | 12/2018 |

OTHER PUBLICATIONS

ZTE et al., "High level views on beam management for NR-MIMO", 3GPP Draft, R1-1611474, High Level Views on Beam Management for NR-MIMO, 3rd Generation Partnership Project (3GPP), Mobile Competence Centre, 650, Route Des Lucioles, F-06921 Sophia-Antipolis Cedex, vol. RAN WG1 Reno, USA, Nov. 14, 2016-Nov. 18, 2016, Nov. 6, 2016, XP051190703, Retrieved from the Internet: URL: http://www.3gpp.org/ftp/tsg_ran/WG1 RL1/TSG R1 87/Docs/.
(Continued)

*Primary Examiner* — Fitwi Y Hailegiorgis
(74) *Attorney, Agent, or Firm* — Jefferson IP Law, LLP

(57) ABSTRACT

The present invention relates to a method and an apparatus for displaying and guiding an optimum beam display. The present invention can be applied to a 5G communication and Internet of Things (IoT) related technology-based intelligent services (for example, smart homes, smart buildings, smart cities, smart cars or connected cars, health care, digital education, retail businesses, security and safety related services, etc.). A method for controlling a terminal according to
(Continued)

an embodiment of the present invention may comprise the steps for: determining whether a center beam having the best antenna gain among a plurality of beams of a terminal is identical to a currently used beam of the terminal; calculating an angle between the currently used beam and the center beam of the terminal if the currently used beam and the center beam of the terminal are not identical; and outputting information indicating an optimum beam direction according to the angle between the currently used beam and the center beam of the terminal.

15 Claims, 20 Drawing Sheets

(51) Int. Cl.
  *H04B 17/318* (2015.01)
  *H04B 7/0408* (2017.01)
  *H04B 7/0413* (2017.01)
(58) Field of Classification Search
  CPC ........... H04B 7/0695; H04B 7/06; G01S 3/14; G01S 3/046

USPC ............................................. 375/267; 342/80
  See application file for complete search history.

(56) References Cited

U.S. PATENT DOCUMENTS

| | | |
|---|---|---|
| 8,265,552 B2 | 9/2012 | Kamel et al. |
| 9,288,007 B2 | 3/2016 | Jover |
| 2004/0166811 A1 | 8/2004 | Moon |
| 2007/0182619 A1* | 8/2007 | Honda ................... H01Q 25/02 |
| | | 342/80 |
| 2010/0315288 A1 | 12/2010 | Liu et al. |
| 2012/0309418 A1 | 12/2012 | Jonsson et al. |
| 2015/0355312 A1 | 12/2015 | Aymes et al. |
| 2016/0049726 A1 | 2/2016 | Fukuda |
| 2017/0018187 A1* | 1/2017 | Kim ....................... G08G 1/166 |
| 2018/0302138 A1 | 10/2018 | Shirakata et al. |

OTHER PUBLICATIONS

Extended European Search Report dated Dec. 6, 2019, issued in European Patent Application No. 18758079.0-1220.

* cited by examiner

FIG. 14
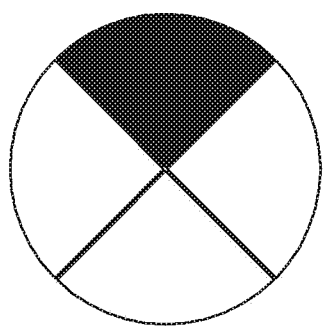
[d]
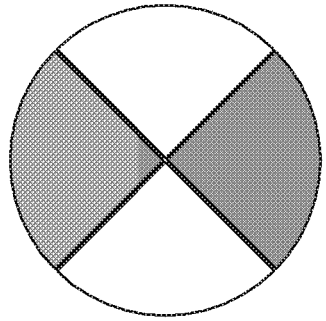
[c]
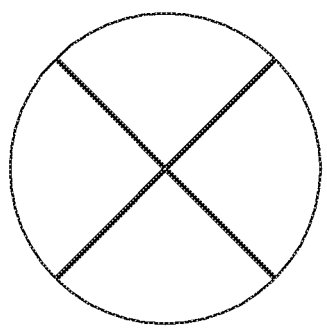
[b]
[a]
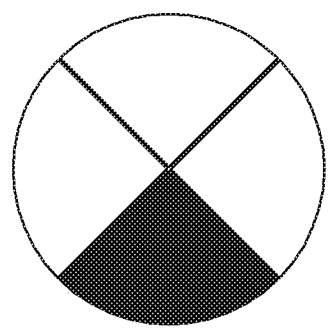
[h]
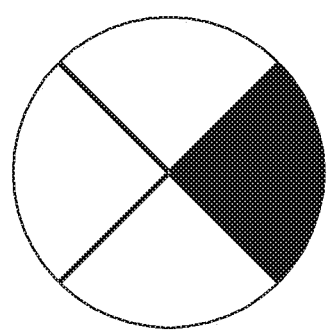
[g]
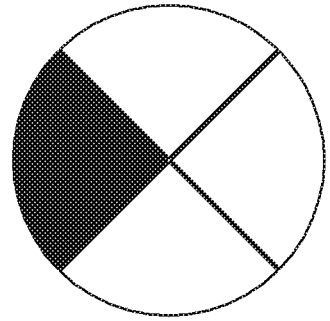
[f]
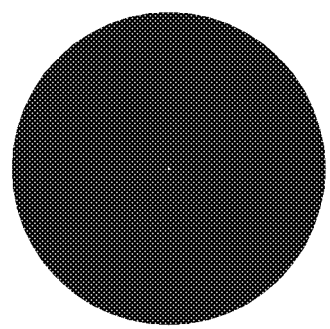
[e]

OPTIMUM BEAM DISPLAY AND GUIDANCE METHOD AND APPARATUS

TECHNICAL FIELD

The disclosure relates to a method and an apparatus for optimum beam display and guidance, and more particularly, to a method and an apparatus for detecting an optimum beam direction having a good signal reception strength and displaying the optimum beam direction to a user in a wireless communication system performing beamforming using high frequencies (millimeter waves).

BACKGROUND ART

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE System." Implementation of the 5G communication system in ultrahigh frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G communication system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, the Internet, which is a human centered connectivity network where humans generate and consume information, is now evolving to the Internet of things (IoT) where distributed entities, such as things, exchange and process information without human intervention. The Internet of everything (IoE) technology, which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by techniques of beamforming, MIMO, and array antennas, which correspond to 5G communication technologies. As the big data processing technology as described above, a cloud radio access network (cloud RAN) may be applied as an example of convergence of 5G technology and IoT technology.

Meanwhile, in order to provide a quality of service (QoS) that suits user's requirements in wireless communication, the strength of a received signal is important, and as the strength of the received signal becomes higher, better QoS can be secured.

DISCLOSURE OF INVENTION

Technical Problem

The disclosure has been made in order to solve the above-described problems, and aspects of the disclosure are to provide a method by a terminal for measuring a direction of an optimum beam (best beam or good beam) to output the direction of the optimum beam on a screen of the terminal or by sound and guiding user's grasp change based on this, thereby finally improving the user's quality of service.

Further, aspects of the disclosure are to provide a method for searching for an optimum beam and providing an indication to a user in the case where a terminal is in a beamforming scan range in an environment using beamforming or even in the case where the terminal deviates from the beamforming scan range. Further, aspects of the disclosure are to provide an optimum beam grouping technique to avoid user's frequent grasp change.

Technical tasks to be accomplished by the disclosure are not limited to those as described above, and unmentioned or other technical tasks can be clearly understood by those of ordinary skill in the art to which the disclosure pertains from the following description.

Solution to Problem

In an aspect of the disclosure in order to solve the above problems, a control method by a terminal includes determining whether a center beam having a best antenna gain among a plurality of beams of the terminal is identical to a currently used beam of the terminal; determining an angle between the currently used beam of the terminal and the center beam in case that the currently used beam of the terminal and the center beam are not identical to each other; and outputting information indicating an optimum beam direction in accordance with the angle between the currently used beam of the terminal and the center beam.

Further, the outputting the information indicating the optimum beam direction may include outputting the information indicating the optimum beam direction in case that it is configured to output the information indicating the optimum beam direction.

Further, the angle between the currently used beam and the center beam of the terminal may include at least one of an azimuth difference between the currently used beam of the terminal and the center beam or an elevation difference between the currently used beam of the terminal and the center beam.

Further, the control method may further include estimating the optimum beam direction before a network entity performing communication with the terminal deviates from a beam search range in case that the network entity is in a state where the network entity deviates from the beam search range; determining a rotation direction and an angle of the terminal using the optimum beam direction before the network entity deviates from the beam search range; and outputting the information indicating the optimum beam direction in accordance with the rotation direction and the angle of the terminal.

Further, the determining the angle between the currently used beam of the terminal and the center beam may include configuring the beams having a signal strength that is higher than a predetermined threshold value among the plurality of beams of the terminal as a beam group; determining whether the currently used beam of the terminal is included in the beam group; and determining the angle between the currently used beam of the terminal and the center beam in case that the currently used beam of the terminal is not included in the beam group.

Further, the determining the angle between the currently used beam of the terminal and the center beam may include determining angle differences between the currently used beam of the terminal and the beams belonging to the beam group in case that the currently used beam of the terminal is not included in the beam group; selecting the beam having the smallest angle difference with the currently used beam of the terminal among the beams belonging to the beam group as an optimum beam; and determining the angle between the currently used beam of the terminal and the optimum beam as the angle between the currently used beam and the center beam of the terminal.

Further, the information indicating the optimum beam direction may include at least one of information indicating a direction in which the terminal is to be rotated, information indicating an angle at which the terminal is to be rotated or an indication line indicating the optimum beam direction.

In another aspect of the disclosure in order to solve the above problems, a terminal includes a transceiver configured to transmit and receive signals and including a plurality of beams; and a controller configured to determine whether a center beam having a best antenna gain among a plurality of beams of the terminal is identical to a currently used beam of the terminal, determine an angle between the currently used beam of the terminal and the center beam in case that the currently used beam of the terminal and the center beam are not identical to each other, and output information indicating an optimum beam direction in accordance with the angle between the currently used beam of the terminal and the center beam.

Further, the controller may be configured to output the information indicating the optimum beam direction in case that it is configured to output the information indicating the optimum beam direction.

Further, the controller may be configured to estimate the optimum beam direction before a network entity performing communication with the terminal deviates from a beam search range in case that the network entity is in a state where the network entity deviates from the beam search range, determine a rotation direction and an angle of the terminal using the optimum beam direction before the network entity deviates from the beam search range, and output the information indicating the optimum beam direction in accordance with the rotation direction and the angle of the terminal.

Further, the controller may be configured to configure the beams having a signal strength that is higher than a predetermined threshold value among the plurality of beams of the terminal as a beam group, determine whether the currently used beam of the terminal is included in the beam group, and determine the angle between the currently used beam of the terminal and the center beam in case that the currently used beam of the terminal is not included in the beam group.

Further, the controller may be configured to determine angle differences between the currently used beam of the terminal and the beams belonging to the beam group in case that the currently used beam of the terminal is not included in the beam group, select the beam having the smallest angle difference with the currently used beam of the terminal among the beams belonging to the beam group as an optimum beam, and determine the angle between the currently used beam of the terminal and the optimum beam as the angle between the currently used beam and the center beam of the terminal.

Further, the terminal may further include an antenna connected to the transceiver and configured to transmit and receive the signals; and an antenna direction adjuster connected to the antenna, wherein the controller is configured to control the antenna direction adjuster to adjust a direction of the antenna to the optimum beam direction.

Advantageous Effects of Invention

According to the disclosure, the terminal supporting the high-frequency beamforming can measure the direction of the optimum beam (best beam or good beam) to output the direction of the optimum beam on the screen of the terminal or by sound and it can guide the user's grasp change based on this, thereby finally improving the user's quality of service.

Further, according to the disclosure, it is possible to provide the method for searching for the optimum beam and to provide the indication to the user in the case where the terminal is in the beamforming scan range in the environment using the beamforming or even in the case where the terminal deviates from the beamforming scan range. Further, according to the disclosure, it is possible to provide the optimum beam grouping technique to avoid the user's frequent grasp change.

The effects that can be obtained by the disclosure are not limited to those as described above, and unmentioned or other effects can be clearly understood by those of ordinary skill in the art to which the disclosure pertains from the following description.

BRIEF DESCRIPTION OF DRAWINGS

FIGS. 7 to 14 are diagrams illustrating examples of optimum beam display information according to an embodiment of the disclosure;

MODE FOR THE INVENTION

Figure 1:
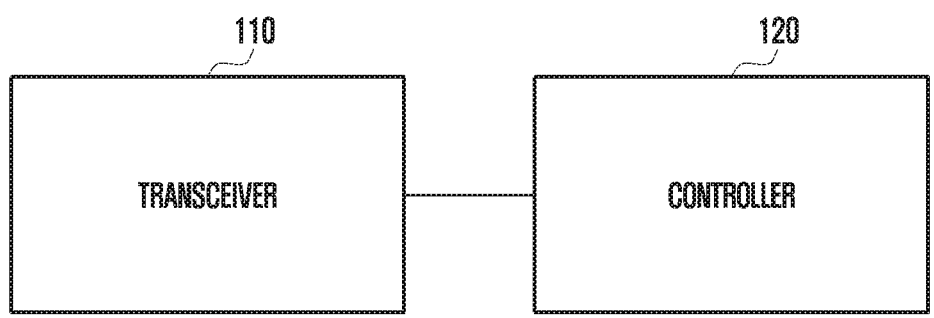
FIG. 1 is a diagram illustrating the block configuration of a terminal according to an embodiment of the disclosure.

In explaining embodiments, explanation of technical contents which are well known in the art to which the disclosure pertains and are not directly related to the disclosure will be omitted. This is to transfer the subject matter of the disclosure more clearly without obscuring the same through omission of unnecessary explanations.

In the description, if it is described that a certain constituent element is connected or attaches to another constituent element, it may mean that the certain constituent element is directly connected or directly attaches to the other constituent element, or it may mean that an intermediate constituent element exists to electrically connect the above-described constituent elements with each other. Further, in the description, the term "include(s)" a specific configuration may not mean that other configurations are excluded, but may mean that additional configurations can be included in the range of the technical idea of the disclosure.

Further, in embodiments of the disclosure, constituent parts are independently illustrated to indicate their different functional features, but do not mean that the respective constituent parts are not in the unit of separated hardware or one software configuration. That is, for convenience in explanation, the respective constituent parts are enumerated in succession, and at least two of the constituent parts may constitute one constituent part, or one constituent part may be divided into a plurality of constituent parts to perform corresponding functions. The integrated and separated embodiments of the respective constituent parts are included in the scope of the disclosure without departing from the essence of the disclosure.

Further, some constituent elements may not be essential constituent elements that perform the essential function in the disclosure, but may be selective constituent elements to improve the performance only. The disclosure may be implemented to include the essential constituent parts for implementing the essence of the disclosure excluding the constituent elements used for the performance improvement only, and the structure including the essential constituent elements excluding the selective constituent elements used for the performance improvement only is included in the scope of the disclosure.

In describing embodiments of the disclosure, related well-known functions or configurations incorporated herein are not described in detail in case where it is determined that they obscure the subject matter of the disclosure in unnecessary detail. Hereinafter, the embodiments of the disclosure will be described in detail with reference to the accompanying drawings. Further, terms to be described later are terms defined in consideration of their functions in the disclosure, but may differ depending on intentions of a user and an operator or customs. Accordingly, they should be defined based on the contents of the whole description of the disclosure.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, establish means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

In this case, the term "~unit", as used in an embodiment, means, but is not limited to, a software or hardware component, such as FPGA or ASIC, which performs certain tasks. However, "~unit" does not mean to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

Prior to the detailed description of the disclosure, interpretable meanings of some wordings used in the description are exemplarily presented. However, it is to be noted that they are not limited to interpretation examples presented hereinafter.

A base station is one subject that communicates with a terminal, and it may be called a BS, base transceiver station (BTS), NodeB (NB), eNodB (eNB), or access point (AP).

The terminal is one subject that communicates with the base station, and it may be called UE, device, mobile station (MS), mobile equipment (ME), terminal, or terminal equipment.

Meanwhile, in order to provide a quality of service (QoS) that suits user's requirements in wireless communication, the strength of a received signal is important, and as the strength of the received signal becomes higher, better QoS can be secured. A representative technique to heighten the received signal is to measure the signal strength, to search for a direction in which a strong signal is received, and to adjust an antenna in the direction in which the strong signal is received. Representatively, an angle of arrival (AOA) technology may be used to measure the signal strength. This technology is to estimate the direction of the transmitted signal through obtaining differences in signal arrival time between respective antennas using a plurality of antennas.

As described above, the AOA technology used to measure the directivity of the signal may be applied to wireless communication systems, such as Bluetooth, Wi-Fi, and LTE, having omnidirectional characteristics mainly in 2.4 GHz and 5 GHz bands, including satellite communication.

Recently, a wireless communication technology using high frequencies is being watched. About 60 GHz Wi-Fi may be a representative one, and it is about 10 times as fast as the existing Wi-Fi, and it can secure a stable wireless speed because it is strong against interference between signals. Such a high-frequency technology has been discussed as an important alternative to not only Wi-Fi but also $5^{th}$ generation cellular communication.

Further, if an ultrahigh-speed wireless communication device using the high frequencies is used, the situation may differ. If a wireless communication frequency is heightened, the transmission speed is heightened through easy securing of the bandwidth, but the wireless communication range becomes narrowed. For example, the ultrahigh-speed Wi-Fi technology using about 60 GHz band may have a signal loss in accordance with a distance that is more than 100 times severer than the signal loss of BLE using about 2.4 GHz band. Further, in such a high-frequency band (e.g., about 28 GHz to 38 GHz band), a beamforming technique using an array antenna may be applied to overcome the signal loss. In this case, the directivity of a transmission/reception antenna may be very important. Accordingly, in a method for measuring an optimum beam of an ultrahigh frequency, beamforming portion should be considered to be important.

According to the disclosure, in a high-frequency communication system using beamforming, the direction of an optimum beam is displayed on a screen of the terminal or it is indicated by sound, and the terminal is enabled to receive a strong signal to heighten the quality of service.

Meanwhile, from the viewpoint of signal strength inscription, in the related art, the terminal displays only the level of signal strength, whereas in the disclosure, the terminal notifies a user of not only the signal strength but also the optimum beam direction to guide a user's grasp change, and thus the quality of service can be improved.

For convenience in explanation, a beam having the best antenna gain or a beam having the best signal reception strength is called a center beam or an optimum beam, and a beam that is not the center beam is called an outer beam or a beam having a bad antenna gain.

Hereinafter, the disclosure will be described in detail. Hereinafter, for convenience in explanation, it is exemplified that the strength of a received signal of a terminal is considered, but the disclosure is not limited thereto, and it can be applied in the same manner even in the case of considering the strength of a transmitted signal of the terminal.

Figure 2:
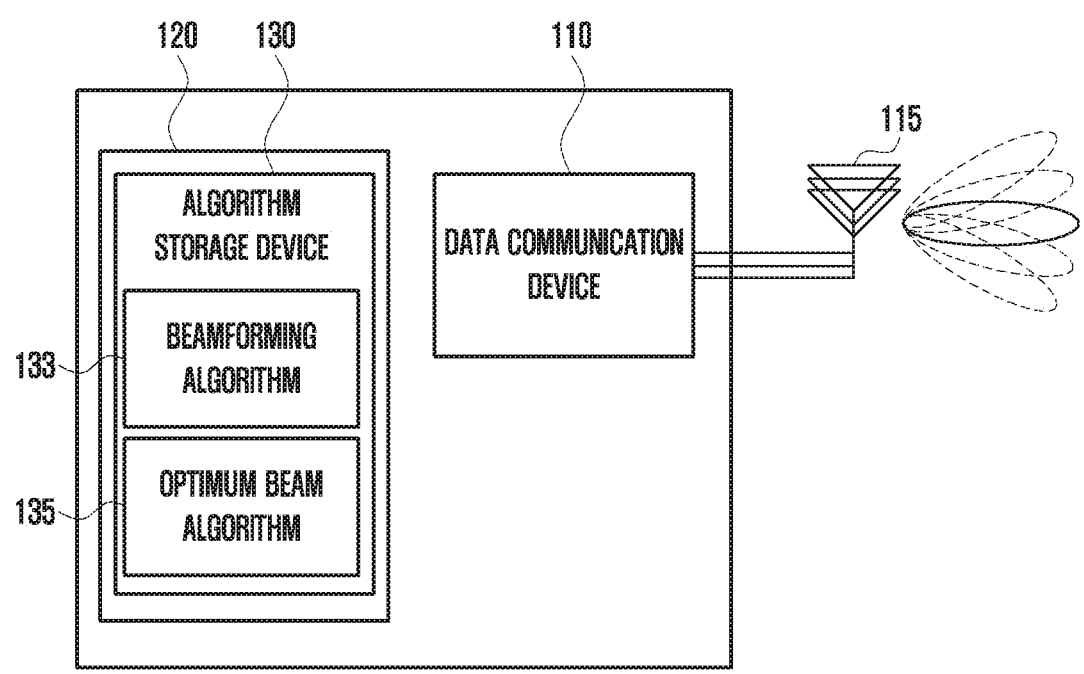
FIG. 2 is a diagram illustrating another example of the block configuration of a terminal according to an embodiment of the disclosure.

FIG. 1 is a diagram illustrating the block configuration of a terminal according to an embodiment of the disclosure, and FIG. 2 is a diagram illustrating another example of the block configuration of a terminal according to an embodiment of the disclosure.

With reference to FIGS. 1 and 2, a terminal according to an embodiment of the disclosure may include a transceiver 110 and a controller 120 configured to control the overall operation of the terminal.

The controller 120 of the terminal controls the terminal to perform any one operation in embodiments to be described later. For example, the controller 120 may determine whether the beam currently used by the terminal is an outer beam, and if the currently used beam is the outer beam, the controller 120 may calculate (determine) an angle of a center beam direction. Further, the controller 120 may control to determine optimum beam indication information in accordance with the calculated angle and to output the determined information.

Further, the transceiver 110 of the terminal may transmit and receive signals in accordance with any one operation in the embodiments to be described later. Further, the transceiver 110 may be a data communication device, and in particular, it may be a high-frequency data communication device for transmitting and receiving high-frequency signals. Here, the high frequency may include about 28 GHz, 39 GHz, 60 GHz, and 70 GHz bands.

Further, the transceiver 110 may be connected to at least one antenna 115. Further, the transceiver 110 may transmit a signal to another network entity (e.g., base station or another terminal) or it may receive a signal from another network entity through the at least one antenna 115. In this case, the at least one antenna 115 may be an array antenna. Accordingly, the transceiver 110 may transmit and receive the signals through a plurality of beams, and the received signal strengths of the respective beams may be different from each other. Accordingly, the controller 120 may control to select the optimum beam and to output information on the optimum beam.

Further, the controller 120 may include an algorithm storage device 130. Further, the algorithm storage device 130 may exist in the terminal as a separate constituent element from the controller 120. In this case, the algorithm storage device 130 may store a beamforming-related algorithm, and it may include a beamforming algorithm storage 133 and an optimum beam algorithm storage 135. The beamforming algorithm storage 133 may store an algorithm related to a beamforming function, and the optimum algorithm storage 135 may store an algorithm for determining the optimum beam of the terminal. In this case, the optimum beam algorithm may be an algorithm for detecting the optimum beam direction having a good signal reception strength and displaying the optimum beam direction to a user.

Meanwhile, it is not necessary to implement the controller 120 and the transceiver 110 as separate devices, and it may be possible to implement the controller 120 and the transceiver 110 as one constituent part in the form of a single chip.

The controller 120 may be implemented on a processor, a single chip, a plurality of chips, or a plurality of electric components. For example, various architectures including dedicated or embedded processor, single-purpose processor, controller, ASIC, and others may be used with respect to the controller 120.

Further, although not illustrated, the terminal may include a display, a signal input unit, a location sensor, a direction sensor, and a speaker. The display may display an operation state of the terminal to enable the user to recognize the same, and the speaker may output a sound signal. Further, an input/output unit may receive an input signal from the user. According to an embodiment, the terminal may include a touch screen in which the display and the signal input unit are combined. Further, the terminal may include the location sensor for sensing information on the current location of the terminal, and the direction sensor for sensing direction information of the terminal.

Further, according to an embodiment, although not illustrated, the terminal may further include an antenna direction adjuster for adjusting the antenna 115. For example, the antenna direction adjuster may include a motor, and it may be mechanically connected to the antenna 115. Further, the antenna direction adjuster may adjust the direction of the antenna 115 to the optimum beam direction in accordance with a control signal of the controller 120. In this case, the adjustment of the direction of the antenna 115 may be performed through mechanical tilt.

Figure 3:
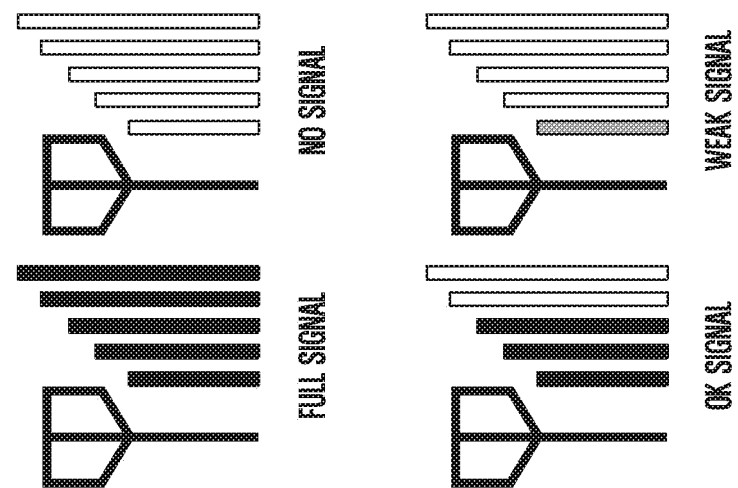
FIG. 3 is an exemplary diagram explaining signal strength of omnidirectional characteristics.
Figure 4:
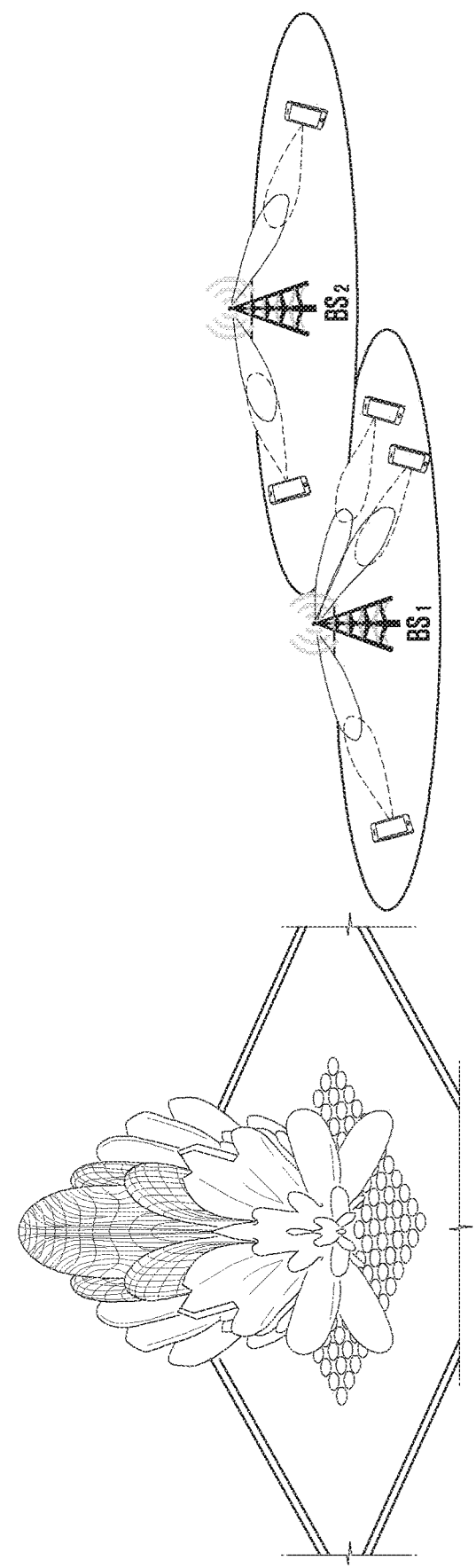
FIG. 4 is an exemplary diagram explaining signal strength of a high-frequency signal according to an embodiment of the disclosure.

FIG. 3 is an exemplary diagram explaining signal strength of omnidirectional characteristics. FIG. 4 is an exemplary diagram explaining signal strength of a high-frequency signal according to an embodiment of the disclosure, and FIG. 5 is an exemplary diagram explaining signal strength in accordance with the direction of a terminal according to an embodiment of the disclosure.

With reference to FIG. 3, in the case of the existing terminals using no beamforming, the signal may have omnidirectional characteristics as exemplified in FIG. 3. Accordingly, only the levels of the received signals are important with respect to the terminals, the terminal may display only the level of the received signal strength on the display. For example, the level of the received signal is displayed in a manner that if the level of the received signal is highest, a large number of bar graphs are displayed on the terminal, and as the level of the received signal becomes lower, a smaller number of bar graphs are displayed.

With reference to FIG. 4, in the case of a high-frequency signal according to an embodiment of the disclosure, it has strong directional characteristics. Further, in the case of considering the beamforming, the received signal may have directivity as exemplified in FIG. 4. Accordingly, if the direction of the antenna 115 of the terminal is directed to the base station direction, the level of the received signal may be high, whereas if the direction of the antenna 115 is opposite to the base station direction, the level of the received signal may be very low, or the connection between the terminal and the base station may be disconnected.

Figure 5:
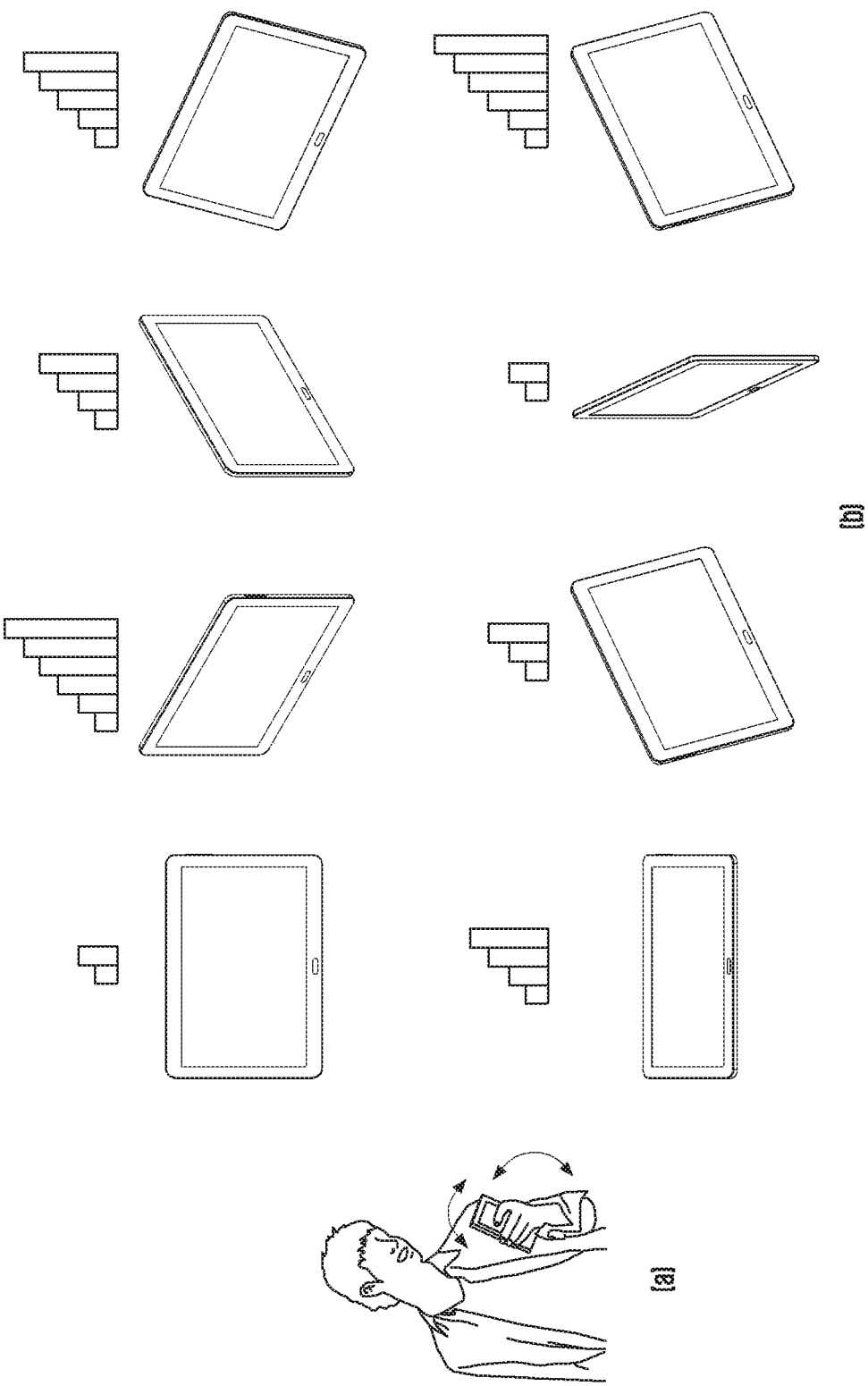
FIG. 5 is an exemplary diagram explaining signal strength in accordance with the direction of a terminal according to an embodiment of the disclosure.

For example, with reference to FIG. 5, as exemplified as (a) in FIG. 5, the user can adjust the direction of the terminal. In this case, as exemplified as (b) in FIG. 5, the received signal strength of the terminal may be changed in accordance with the direction of the terminal. Further, although not illustrated, the antenna direction adjuster connected to the antenna 115 of the terminal may adjust the direction of the antenna 115 through mechanical adjustment. In this case, through adjustment of the direction of the antenna 115, the received signal strength of the terminal may be changed.

As described above, in the case of the wireless communication system using the high-frequency signal according to an embodiment of the disclosure, the directivity should be considered to be important together with the signal strength.

Figure 6:
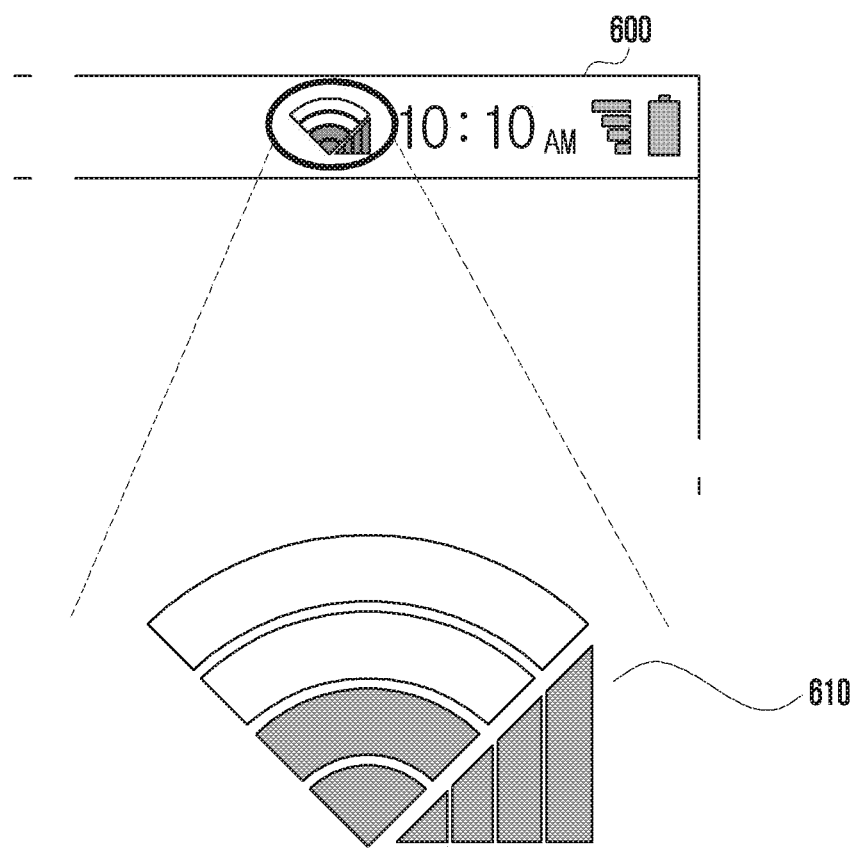
FIG. 6 is a diagram illustrating an example of displaying optimum beam indication information on a terminal according to an embodiment of the disclosure.

FIG. 6 is a diagram illustrating an example of displaying optimum beam indication information on a terminal according to an embodiment of the disclosure, and FIGS. 7 to 14 are diagrams illustrating examples of optimum beam display information according to an embodiment of the disclosure.

As described above, in a communication environment using a high-frequency signal, the signal directivity should be considered to be important together with the signal strength. Accordingly, it may be necessary to notify a user of information that enables the user to recognize the direction in which the signal strength is higher than the current signal strength together with the signal strength. In this case, the user may adjust the direction of the terminal (i.e., direction of the terminal antenna 115) to the direction in which the signal strength is high, and thus the terminal can receive a stronger signal to improve the quality of service and to increase the communication efficiency.

For this, as exemplified in FIG. 6, optimum beam indication information 610 determined by the optimum beam algorithm may be displayed on the display 600 of the terminal. The optimum beam indication information 610 may be called optimum beam direction information, optimum beam user guide information, optimum beam notification information, optimum beam display information, signal strength and direction information, best beam indicator, or center beam indication information, and it may correspond to display of information on the direction in which the signal strength is higher than that in the current direction of the terminal. Further, according to an embodiment, the optimum beam indication information 610 may be called to include the information on the direction in which the signal strength is higher than that in the current direction of the terminal and the information one the current signal strength.

Meanwhile, in FIG. 6, it is exemplified to display the optimum beam indication information 610 as a main indicator on a control display window of the display 600 of the terminal (i.e., a portion on which the current state of the terminal is displayed, and it means a portion on which the terminal state, such as current time, battery state, and terminal connection state, are continuously displayed). However, the display state is not limited thereto, and for example, the optimum beam indication information 610 may be displayed in the form of a floating icon inside the screen of the terminal.

The optimum beam indication information 610 may be displayed on the display 600 of the terminal in the form of a two-dimensional (2D)/three-dimensional (3D) icon or in the form of an indication line. Further, according to an embodiment, the optimum beam indication information 610 may be output as a sound signal such as a voice through the speaker. For example, if the direction in which the signal strength is high is the right side of the terminal, the terminal may notify the user of the optimum beam indication information 610 through outputting of a voice signal, such as "right" or "left".

Figure 7:
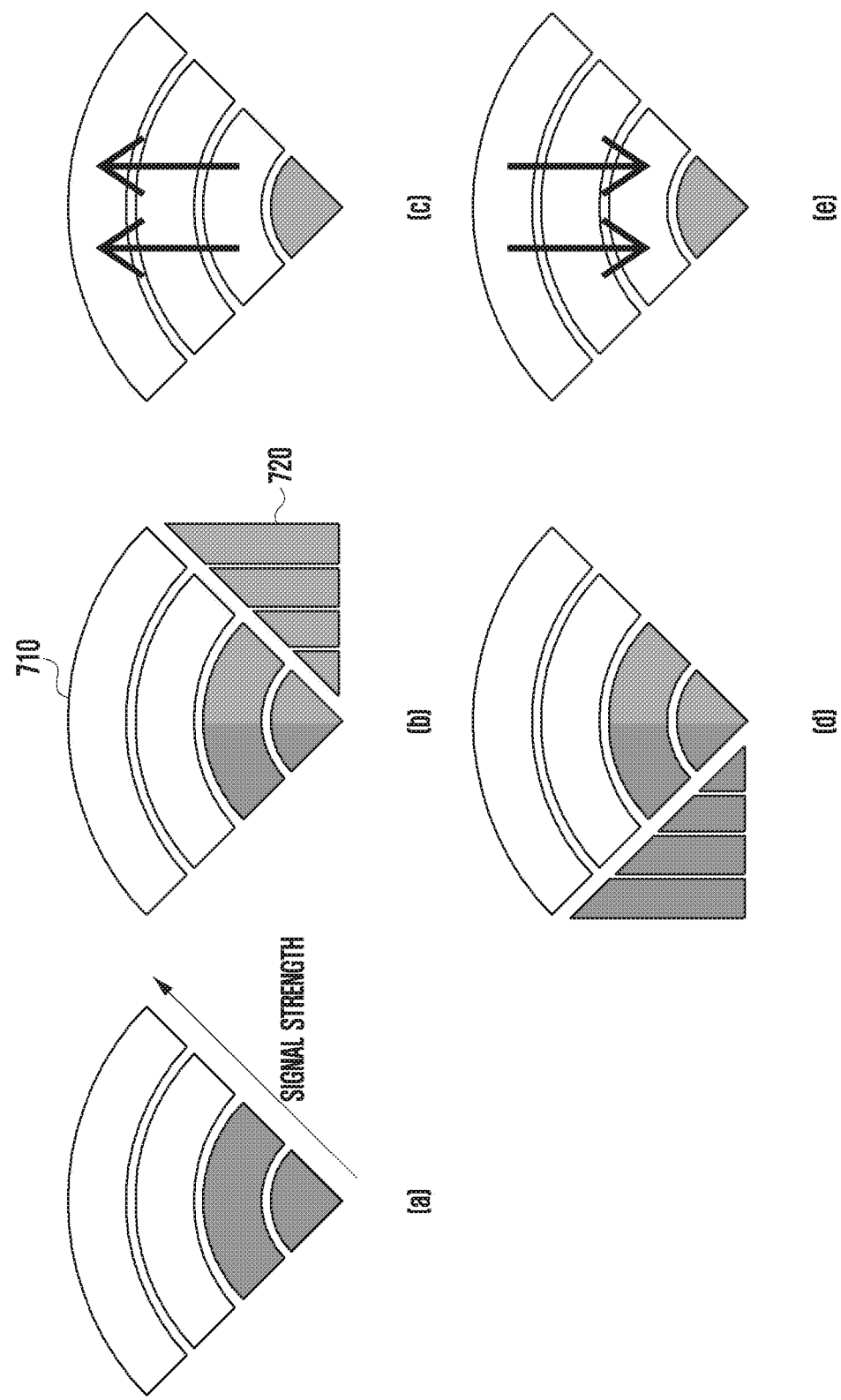
Figure 8:
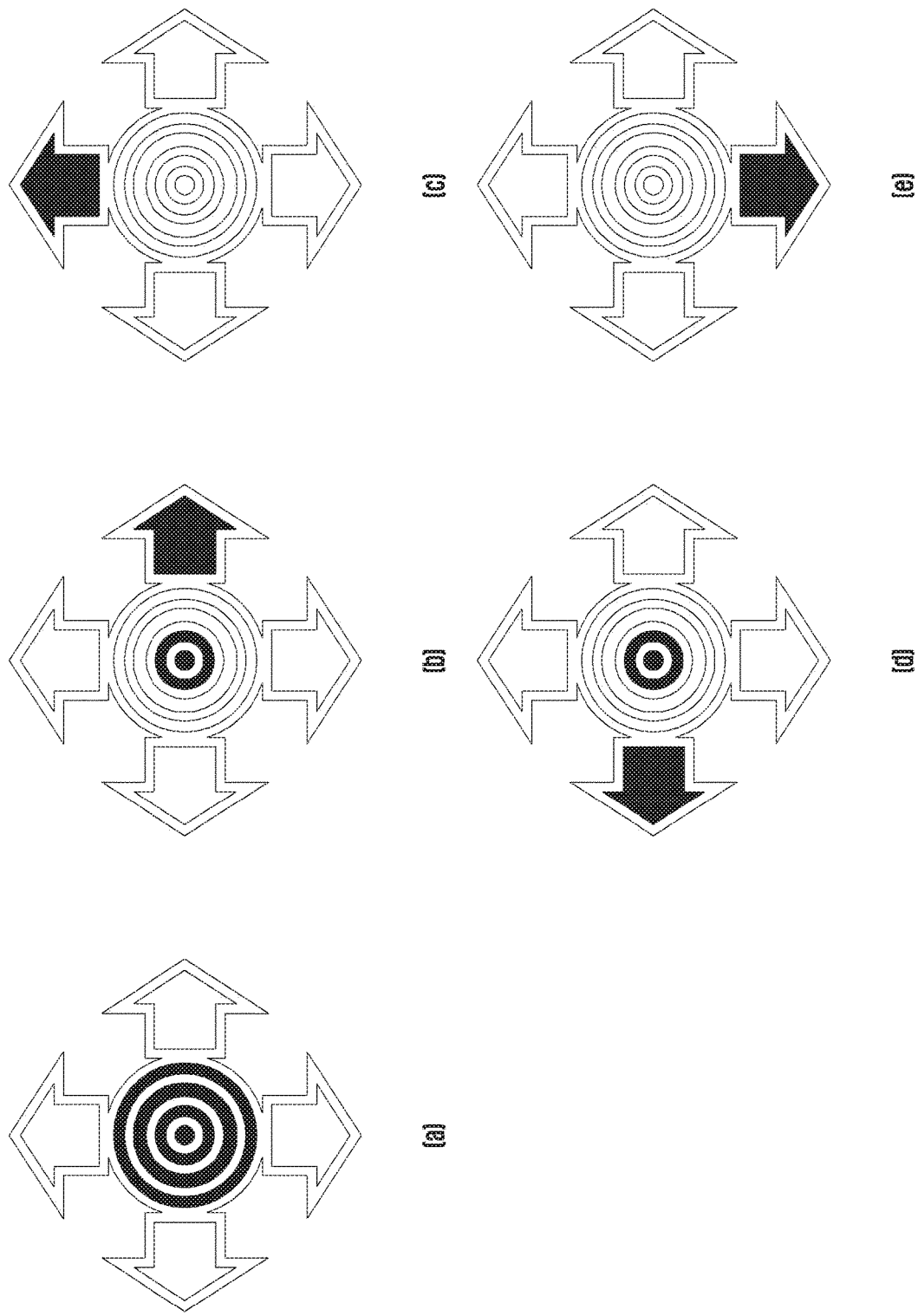
Figure 9:
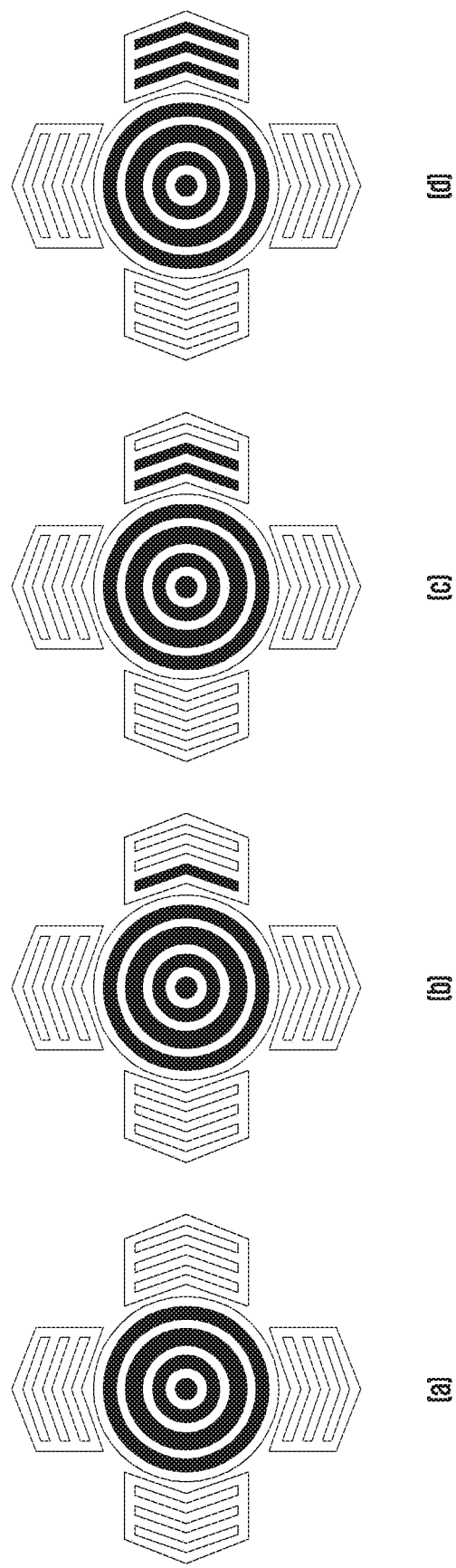

With reference to FIGS. 7 to 9, the terminal may display the optimum beam indication information 610 in the form of an icon on the display 600 of the terminal. That is, the terminal may display the information indicating the signal strength in accordance with the current direction of the terminal in the form of an icon, such as a graph, a fan shape, a concentric circle, or a polygon (triangle or rectangle). Further, the terminal may display information on the direction in which the signal strength is higher than that in the current direction of the terminal (i.e., optimum beam direction) on a right, left, upper, or lower side of the information indicating the signal strength or on the information indicating the signal strength in the form of an icon, such as a graph or an arrow.

With reference to FIG. 7, the information indicating the signal strength may be displayed in the form of a graph such as a fan shape. Further, on the left or right side of the graph of the fan shape, the information on the direction in which the signal strength is higher than that in the current direction of the terminal (i.e., optimum beam direction) may be displayed in the form of an icon.

For example, with reference to (a) in FIG. 7, the graph of the fan shape is displayed as a whole to indicate that the current signal strength is highest.

Further, as indicated as (b) in FIG. 7, the graph of the fan shape is displayed in part to indicate that the signal strength is in a middle level. In this case, an icon may be displayed on the right side of the information indicating the signal strength. In this case, the icon displayed on the right side of the information indicating the signal strength may mean that the signal strength in the rightward direction is higher than that in the current direction. Accordingly, the user can recognize that a stronger signal can be received in the case of rotating the terminal direction on the right. Accordingly, in the case where the user rotates the terminal on the right, a stronger signal can be received.

As indicated as (c) in FIG. 7, the graph of the fan shape may be displayed in the minimum part or it may not be displayed to indicate that the signal strength is weak. In this case, an icon in the form of an arrow indicating an upward direction may be displayed on the information indicating the signal strength. Further, although not illustrated, according to an embodiment, an icon may be displayed on an upper side of the information indicating the signal strength. In this case, the icon in the form of an arrow indicating the direction that is displayed on the information indicating the signal strength may mean that the signal strength in an upward direction is higher than that in the current direction.

As indicated as (d) in FIG. 7, it is indicated that the signal strength is in a middle level. Further, an icon may be displayed on the left side of the information indicating the signal strength to indicate that the signal strength in the leftward direction is higher than that in the current direction. Further, as indicated as (e) in FIG. 7, it is indicated that the signal strength is weak. Further, an icon in the form of an arrow indicating the lower direction may be displayed on the information indicating the signal strength to indicate that the signal strength in a downward direction is higher than that in the current direction.

Even in these cases, the user can recognize that a stronger signal can be received if the user rotates the direction of the terminal in the upward, leftward, or downward direction, and thus a stronger signal can be received in the case where the direction of the terminal is adjusted accordingly.

Meanwhile, according to an embodiment, the optimum beam indication information 610 may include not only information on the direction in which the signal strength is higher than that in the current direction of the terminal but also information on how much the direction of the terminal should be moved together with the direction information.

With reference to (b) in FIG. 7, on the right side of information 710 indicating the signal strength, information 720 indicating that the signal strength in the rightward direction is higher may be displayed. In this case, by adjusting the size of the information 720 indicating that the signal strength in the rightward direction is higher, the information on how much the direction of the terminal should be moved may be indicated. For example, as illustrated, if the direction in which the signal strength is high is indicated with four icons, it means that the terminal should be rotated by 90° in the rightward direction. Further, if the direction in which the signal strength is high is indicated with three icons, it means that the terminal should be rotated by 60° in the rightward direction. Further, if the direction in which the signal strength is high is indicated with one icon, it means that the terminal should be rotated by 20° in the rightward direction.

Further, according to an embodiment, the optimum beam indication information 610 may include a sound signal. For example, in the case as indicated as (b) in FIG. 7, a sound signal for indicating that the rightward direction is the direction in which the signal strength is high may be output along with displaying of the icon indicating that the direction in which the signal strength is higher than that in the current direction of the terminal is the rightward direction. For example, it may be possible to output a sound signal, for example, "right", "rightward", "rightward rotation by XX degrees", "UHD video can be viewed in the case of rightward rotation by XX degrees", "download speed is improved in the case of rightward rotation by XX degrees", or "download speed is improved Y times in the case of rightward rotation by XX degrees". Further, the sound signal may be a sound signal predetermined in accordance with the optimum beam direction. For example, if the signal strength in the rightward direction is higher than that in the current direction of the terminal, the terminal may output a short sound signal once, and if the signal strength in the leftward direction is higher, the terminal may output a short sound signal twice. Further, if the signal strength in the upward direction is higher, the terminal may output a long sound signal once, and if the signal strength in the downward direction is higher, the terminal may output a long sound signal twice.

Next, with reference to FIG. 8, the information indicating the signal strength may be displayed in the form of a concentric circle graph. Further, on the left, right, upward, or downward side of the graph of the concentric circle, the information on the direction in which the signal strength is higher than that in the current direction of the terminal (i.e., optimum beam direction) may be displayed in the form of an icon. Further, the information on the direction may be an icon in the form of an arrow.

For example, with reference to (a) in FIG. 8, the graph of the concentric circle is displayed as a whole to indicate that the current signal strength is highest.

Further, as indicated as (b) in FIG. 8, the graph of the concentric circle is displayed in part to indicate that the signal strength is in a middle level. In this case, an icon may be displayed on the right side of the information indicating the signal strength. According to an embodiment, the icon may be in the form of an icon. In this case, the icon displayed on the right side of the information indicating the signal strength may mean that the signal strength in the rightward direction is higher than that in the current direction. Accordingly, the user can recognize that a stronger signal can be received in the case of rotating the terminal direction on the right. Accordingly, in the case where the user rotates the terminal on the right, a stronger signal can be received.

As indicated as (c) in FIG. 8, the graph of the concentric circle may be displayed only in the minimum part or it may not be displayed to indicate that the signal strength is weak. In this case, an icon may be displayed on an upper side of the information indicating the signal strength. In this case, the icon in the form of an arrow indicating the direction that is displayed on the information indicating the signal strength may mean that the signal strength in an upward direction is higher than that in the current direction.

As indicated as (d) in FIG. 8, it is indicated that the signal strength is in a middle level. Further, an icon may be displayed on the left side of the information indicating the signal strength to indicate that the signal strength in the leftward direction is higher than that in the current direction. Further, as indicated as (e) in FIG. 8, it is indicated that the signal strength is weak. Further, an icon may be displayed on the lower side of the information indicating the signal strength to indicate that the signal strength in a downward direction is higher than that in the current direction.

Even in these cases, the user can recognize that a stronger signal can be received if the user rotates the direction of the terminal in the upward, leftward, or downward direction, and thus a stronger signal can be received in the case where the direction of the terminal is adjusted accordingly.

Meanwhile, with reference to FIG. 9, on the right side of the information indicating the signal strength, information indicating that the signal strength in the rightward direction is higher may be displayed. In this case, by adjusting the size of the information indicating that the signal strength in the rightward direction is higher, the information on how much the direction of the terminal should be moved may be indicated. For example, through the size of the arrow or the number of arrows, it is possible to display information on how much the direction of the terminal should be moved. That is, if the size of the arrow is large, or a large number of arrows are provided, it may indicate that the terminal should be rotated greatly, whereas if the size of the arrow is small or a small number of arrows are provided, it may indicate that the terminal should be less rotated.

For example, as indicated as (a) in FIG. 9, if information on the direction in which the signal strength is higher than that in the current direction of the terminal is not displayed, it may indicate that it is not necessary to adjust the direction of the terminal. Further, as indicated as (b) in FIG. 9, as information on the direction in which the signal strength is higher than that in the current direction of the terminal, one arrow indicating the rightward direction may be displayed. In this case, one arrow indicating the rightward direction may mean that a stronger signal can be received if the terminal is rotated at about 30° in the rightward direction. Further, as indicated as (c) in FIG. 9, in the case where two arrows indicating the rightward direction are displayed, it may mean that a stronger signal can be received if the terminal is rotated at about 60° in the rightward direction. Further, as indicated as (d) in FIG. 9, in the case where three arrows indicating the rightward direction are displayed, it may mean that a stronger signal can be received if the terminal is rotated at about 90° in the rightward direction.

Further, the optimum beam indication information 610 may include a sound signal. Because the sound signal has been explained with reference to FIG. 7, the detailed explanation thereof will be omitted.

Figure 10:
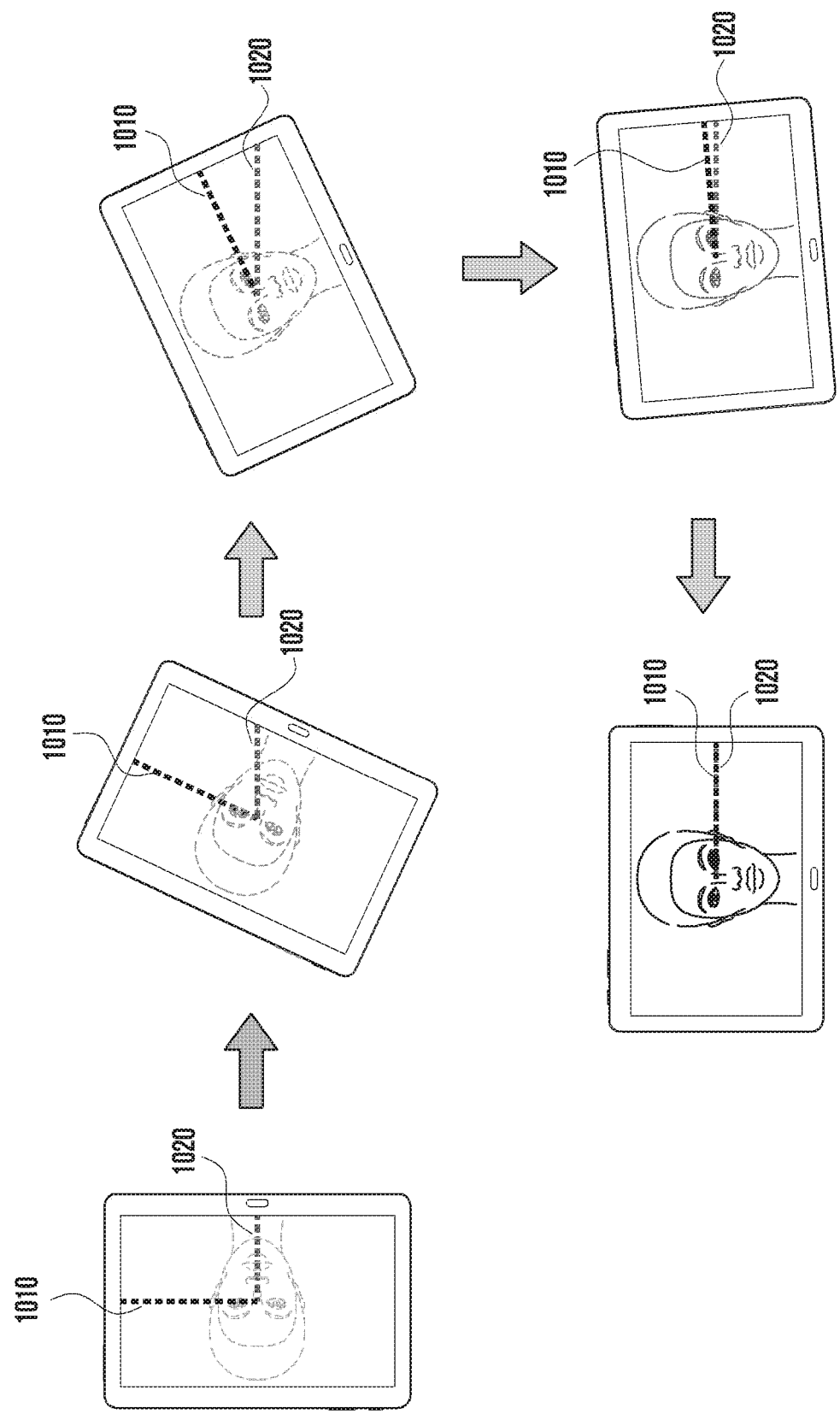

With reference to FIG. 10, the terminal may display the optimum beam indication information 610 on the display 600 of the terminal in the form of indication lines 1010 and 1020.

In this case, the indication lines 1010 and 1020 may be displayed on the display of the terminal, and they may include a first indication line 1010 and a second indication line 1020. Further, the first indication line 1010 may indicate the current direction of the terminal or the current direction of the antenna 115 of the terminal, and the second indication line 1020 may indicate the optimum signal direction (optimum beam direction). In contrast, the first indication line 1010 may indicate the optimum beam direction, and the second indication line 1020 may indicate the direction of the terminal. However, the number of indication lines is not limited thereto, and three or more indication lines may be displayed in order to provide the direction in which the signal strength is high more precisely. Further, only one indication line indicating the direction in which the signal strength is highest may be displayed, and the user may receive the strong signal through adjustment of the indication line to be vertical to the upper side surface of the terminal.

In an embodiment in which two indication lines 1010 and 1020 are provided, as exemplified in the first figure of FIG. 10, the received signal may be weak if the first indication line 1010 and the second indication line 1020 do not coincide with each other. In this case, a blur image (e.g., SD image) may be displayed on the display of the terminal, or a file download speed may become very low. Meanwhile, the second indication line 1020 indicating the optimum beam direction is displayed on the right side of the first indication line 1010 indicating the current terminal direction, and the user can recognize that the signal strength becomes high if the user rotates the terminal on the right side. Accordingly, as the user rotates the terminal on the right, the signal strength may gradually be heightened. As described above, this is caused by straightness of the high-frequency signal (mmWave), and the signal becomes stronger if the direction of the antenna 115 of the terminal (i.e., beam of a receiver) and the received signal direction (i.e., beam of a transmitter) face each other.

Accordingly, as exemplified as in the last figure of FIG. 10, if the terminal is rotated so that the first indication line 1010 and the second indication line 1020 coincide with each other, a strong signal can be received in the terminal. Accordingly, a vivid image (e.g., HD image or UHD image) can be displayed on the display of the terminal, or the file download speed can be improved.

Further, according to an embodiment, the optimum beam indication information may include a sound signal together with the indication lines 1010 and 1020. Because the sound signal has been explained with reference to FIG. 7, the detailed explanation thereof will be omitted.

Figure 11:
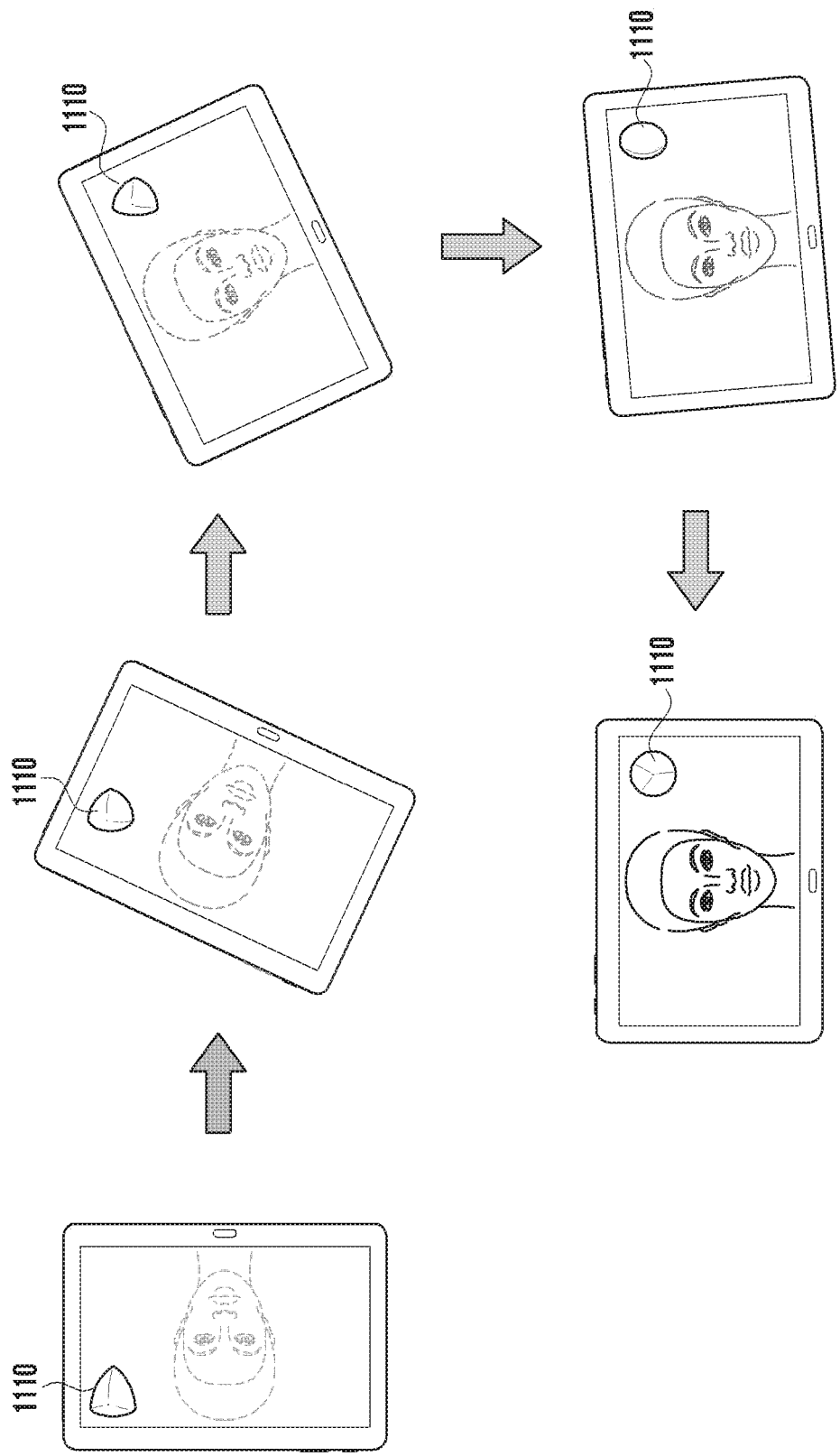

With reference to FIG. 11, the terminal may display optimum beam indication information 610 on the display 600 of the terminal as a 3D icon 1110.

For example, if the signal strength is high, the 3D icon 1110 may be displayed in the form of a circle (or sphere). Further, if the current signal strength of the terminal is weak, the 3D icon 1110 may be displayed in a distorted shape projecting in the direction in which the signal strength is higher than that in the current direction of the terminal. That is, as shown in the first figure of FIG. 11, if the direction in which the signal strength is higher than that in the current direction of the terminal is the rightward direction, the 3D icon 1110 may be displayed in a distorted shape projecting on the right side. Further, if the terminal is rotated, and the terminal direction (antenna direction of the terminal) is adjusted in the direction in which the signal strength is high, the degree of projection may be reduced. Further, as shown in the last figure of FIG. 11, if the terminal direction coincides with the direction in which the signal strength is high, the 3D icon 1110 may be displayed in the form of a circle.

Further, according to an embodiment, the optimum beam indication information 610 may include a sound signal together with the 3D icon 1110. Because the sound signal has been explained with reference to FIG. 7, the detailed explanation thereof will be omitted.

Figure 12:
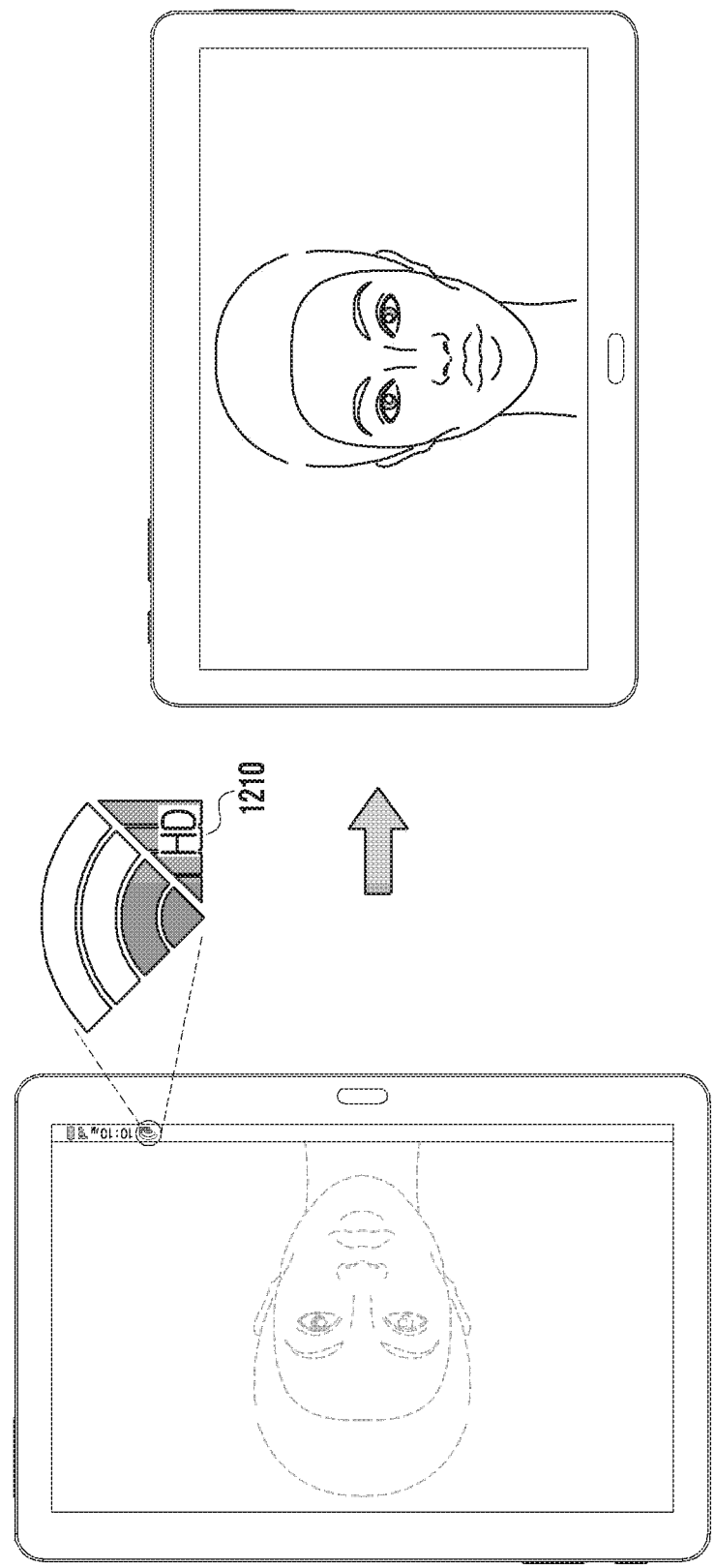

With reference to FIG. 12, the terminal may display the optimum beam indication information 610 on the display 600 of the terminal in the form of an icon. In this case, together with an icon indicating information on the signal strength in accordance with the current direction of the terminal, information on the direction in which the signal strength is higher than that in the current direction of the terminal may be displayed as the optimum beam indication information 610. Further, according to an embodiment, the terminal, as shown in FIG. 12, may additionally display information 1210 indicating that it is possible to receive a high-quality signal if the terminal is rotated in the optimum beam direction on the information on the optimum beam direction. For example, if the rightward direction is the optimum beam direction, the terminal may display an icon for indicating the optimum beam direction on the right side of the information indicating the signal strength. Further, together with the icon indicating the optimum beam direction, the terminal may indicate that it is possible to receive a high-quality signal if the terminal is rotated on the right side. For example, if it is possible to view a high-quality image through rightward rotation of the terminal, the terminal may additionally display an icon 1210 such as "HD" or "UHD" together with the icon indicating the optimum beam direction.

Further, although not illustrated, in the case of downloading the current file, the terminal may display the remaining time until completion of the download on the display 600. In this case, if the terminal is rotted in the direction, the optimum beam indication information 610 may display the remaining time until completion of the download together with the icon indicating the optimum beam direction. For example, the terminal may display that 5 minutes remain until the download is completed on the display 600 in accordance with the current direction of the terminal. Further, an icon indicating that the rightward direction is the optimum beam direction is displayed on the display, and in the case where the terminal is rotated on the right side, the terminal may display that two minutes remain until the download on the display.

Figure 13:
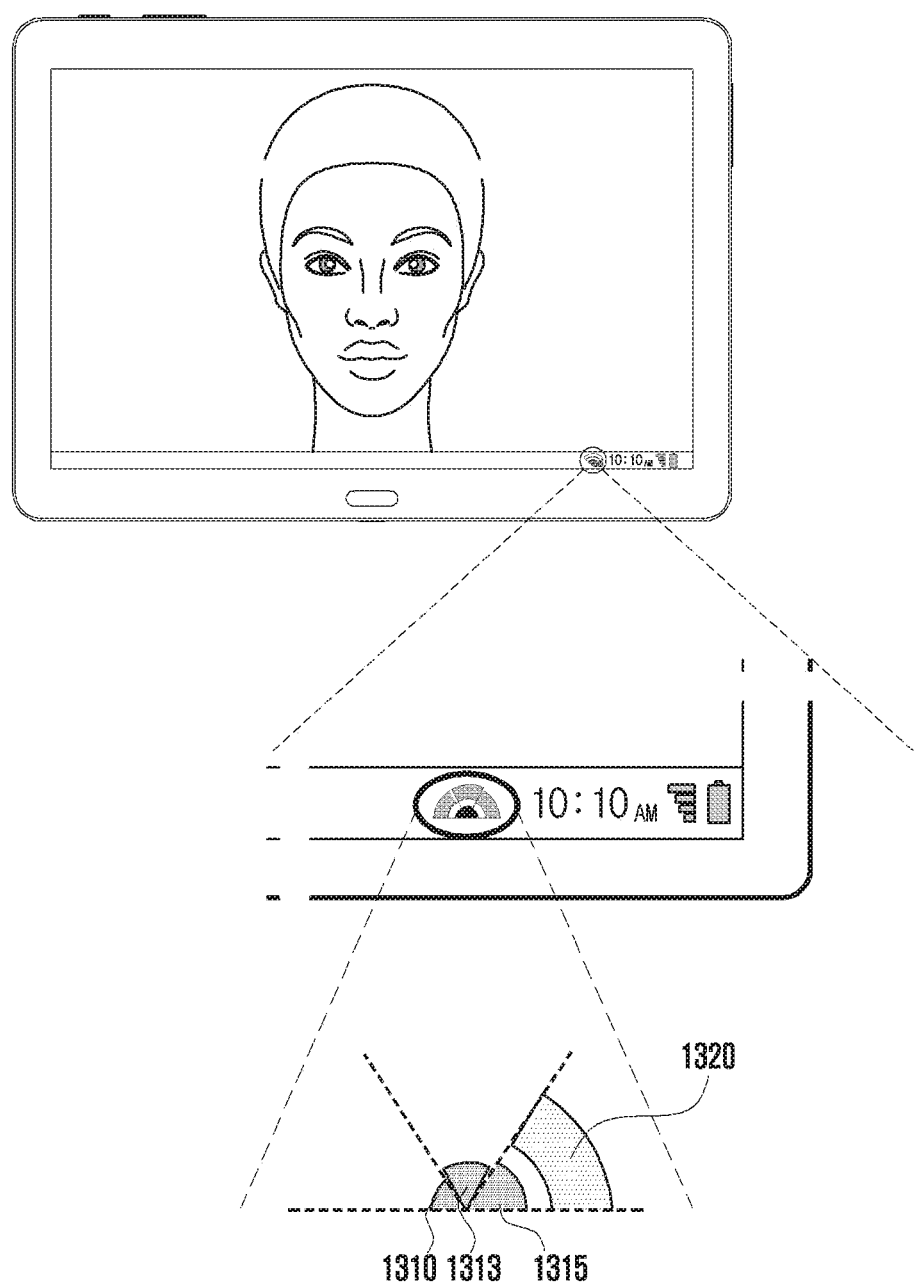

Further, with reference to FIG. 13, the terminal may display the optimum beam indication information 610 on the display 600 in the form of an icon. In this case, the optimum beam indication information 610 may include information 1310, 1313, and 1315 on the signal strength for respective directions of the terminal and information 1320 on the optimum beam direction.

For example, the optimum beam indication information 610 may divide the direction of the terminal into three directions, and it may display the signal strength for each direction as the size of the icon. That is, in the direction in which the signal strength is weak, the icon may be displayed with a small size (1310), and in the direction in which the signal strength is middle, the icon may be displayed with a middle size (1313). Further, in the direction in which the signal strength is high, the icon may be displayed with a large size (1315). In an example of FIG. 13, the user can recognize that the signal strength in the rightward direction of the terminal is highest through the sizes of the icon 1310, 1313, and 1315.

In addition, the optimum beam indication information 610 may additionally display information 1320 on the direction change of the terminal in order to receive an optimum beam. In an example of FIG. 13, the signal strength in the rightward direction of the terminal is highest, and the icon 1320 for guiding the rightward rotation of the terminal may be displayed together with the information 1315 indicating the signal strength. On the other hand, if it is not necessary to change the direction of the terminal, the information 1320 on the optimum beam direction may not be displayed.

FIG. 14 is a diagram illustrating examples of icons indicating both information on the signal strength of the terminal and information on the optimum beam direction. For example, if the current signal is weak or no signal exists, there may be no display as shown as (a) in FIG. 14. Further, if the signal strength is high, the whole region may be displayed as shown as (e) in FIG. 14. On the other hand, if the terminal recognizes that the signal strength becomes high in the case where the terminal is rotated up and down (i.e., in the case where the terminal is rotated by 180°), upper and lower regions may be displayed as shown as (b) in FIG. 14. Further, if the terminal recognizes that the signal strength becomes high in the case where the terminal is rotated left and right (i.e., in the case where the terminal is rotated in a vertical direction), left and right regions may be displayed as shown as (c) in FIG. 14. Further, if the regions in which the signal strength is high is right, left, upper, and lower sides of the terminal, the right, left, upper, and lower regions are displayed as shown as (d), (h), (f), and (g) to guide the direction change of the terminal.

Meanwhile, although not illustrated, according to an embodiment, the terminal may display the kind of the current communication of the terminal together with the signal strength. For example, if the current communication is $5^{th}$ generation (5G) or new radio (NR) using the high-frequency bands, 5G or NR may be displayed together with the signal strength. Further, if the current communication is LTE or 3G, corresponding information may be displayed together with the signal strength.

Further, according to an embodiment, the optimum beam indication information 610 may be output through the display or the speaker only in the case where a predetermined condition is satisfied. For example, the terminal may output the optimum beam indication information 610 through the display or the speaker only in the case where a user input exists. That is, only in the case where a predetermined signal is applied through the input unit, the terminal may display the optimum beam indication information 610 on the display or it may output the optimum beam indication information 610 as a sound signal through the speaker.

For example, only in the case where the user touches the icon indicating the signal strength on the touch screen, the terminal may output the icon indicating the optimum beam direction onto the display. Further, only in the case where the user touches the icon indicating the signal strength on the touch screen, the terminal may output the sound signal indicating the optimum beam direction. Further, if a specific signal is input from the user in a state where both the icon indicating the signal strength and the icon indicating information on the optimum beam direction are being displayed, the terminal may output the sound signal indicating the optimum beam direction.

Further, according to an embodiment, only in the case where the current signal strength is lower than a predetermined threshold value, the terminal may output the optimum beam indication information 610. Further, according to an embodiment, the user can configure whether to display the optimum beam indication information 610. If the configuration is in an on state, the optimum beam indication information 610 may be output, whereas if the configuration is in an off state, the optimum beam indication information 610 may not be output. Further, according to an embodiment, the optimum beam indication information 610 may be displayed in accordance with the kind of an execution application of the terminal. For example, if an application for executing a file for which signal transmission/reception is not necessary already exists in the terminal and it is being driven, the quality of service may not differ in accordance with the signal strength. In this case, it is less necessary to display the optimum beam indication information 610 so that the user can adjust the direction of the terminal, and thus the terminal may not output the optimum beam indication information 610.

This is for the terminal to output the optimum beam indication information 610 for user's convenience. For example, if the optimum beam indication information 610 is additionally output onto the display of the terminal in a state where the user executes a game application in the terminal, the user may consider that this information disturbs the game. Further, in the case where the user concentrates his/her attention on the game application being executed, it may be hard for the user to adjust the direction of the terminal even if the optimum beam indication information 610 is output. Accordingly, only in the case where a specific condition is satisfied in accordance with the user's convenience, the terminal may control to output the optimum beam indication information 610.

Next, a beamforming algorithm for the terminal to output the optimum beam indication information 610 will be described.

Figure 15:
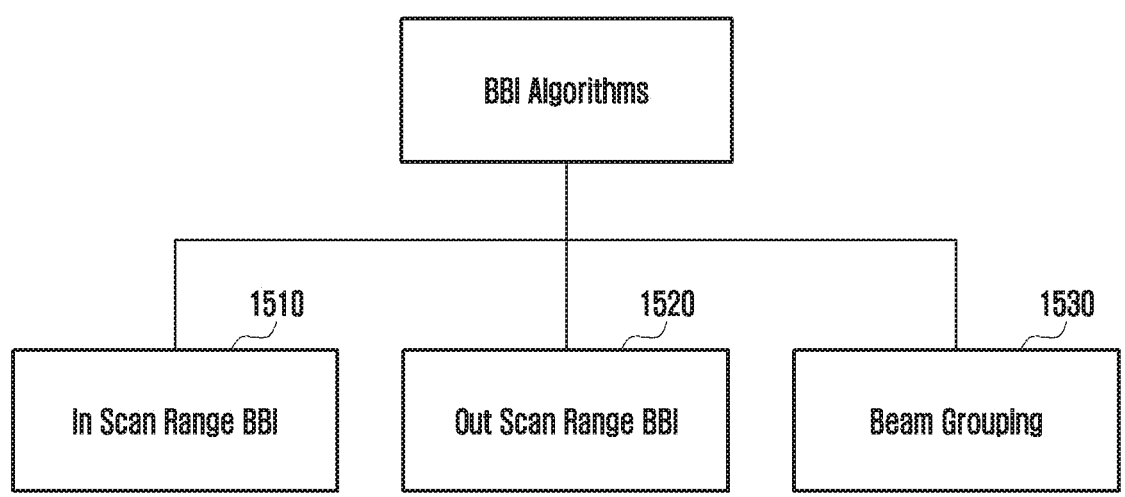
FIG. 15 is a diagram illustrating an example of an optimum beam algorithm according to an embodiment of the disclosure.

FIG. 15 is a diagram illustrating an example of an optimum beam algorithm according to an embodiment of the disclosure.

With reference to FIG. 15, the optimum (best) beam indicator algorithms (BBI algorithms) according to an embodiment of the disclosure may be briefly classified into 3 kinds.

That is, the optimum beam algorithm may include an optimum beam guidance algorithm in a beam scan range, an optimum beam guidance algorithm in the case of deviating from a beam scan range, and a beam grouping algorithm for minimizing user's intervention.

The optimum beam guidance algorithm 1510 in the beam scan range is an algorithm for guiding the optimum beam in the case where the terminal is located within the beam scan range. Further, the optimum beam guidance algorithm 1520 in the case of deviating from the beam scan range is an algorithm for guiding the optimum beam in the case where the terminal deviates from the beam scan range. Further, the beam grouping algorithm 1530 is an algorithm for grouping the beams based on the threshold value and for not displaying the optimum beam direction in the case where there is a beam belonging to the same group in order to prevent user's excessive intervention in accordance with frequent optimum beam direction display.

Hereinafter, the respective algorithms will be described in detail.

Figure 16:
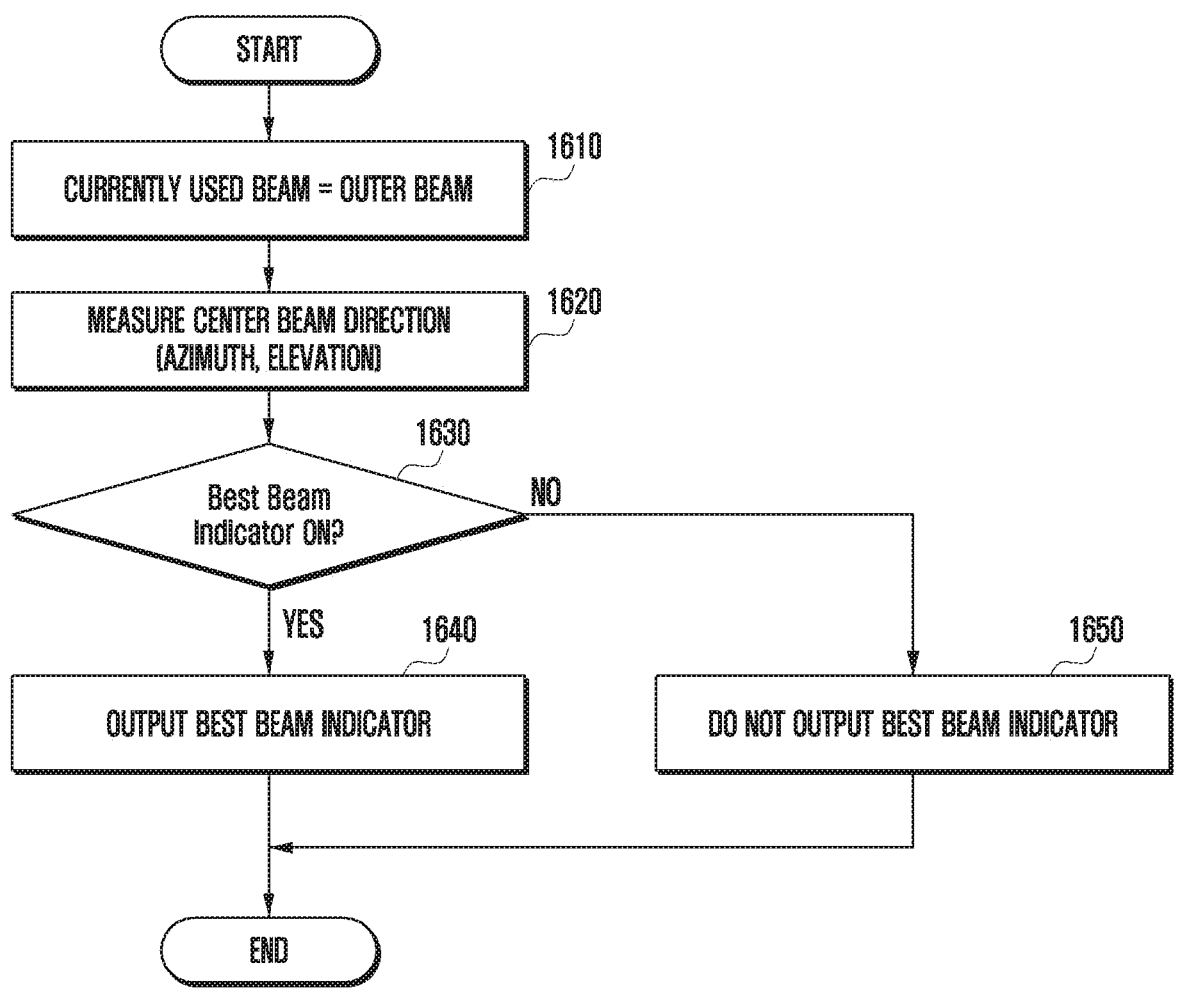
FIG. 16 is a diagram illustrating an example of an optimum beam guidance method in a beam search range according to an embodiment of the disclosure.
Figure 17:
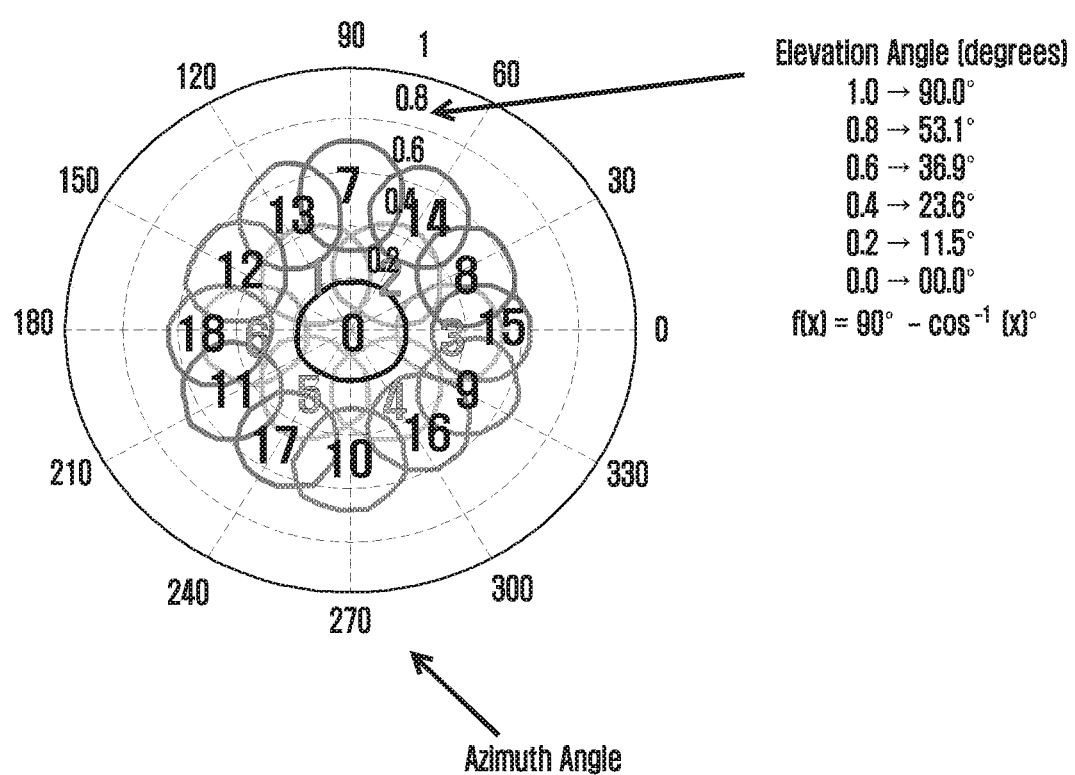
FIG. 17 is a diagram illustrating an example of signal strength for each beam according to an embodiment of the disclosure.

FIG. 16 is a diagram illustrating an example of an optimum beam guidance method in a beam search range according to an embodiment of the disclosure, and FIG. 17 is a diagram illustrating an example of signal strength for each beam according to an embodiment of the disclosure.

With reference to FIG. 16, at operation 1610, the terminal may identify whether the currently used beam is an outer beam. That is, the terminal may identify whether the beam having the best reception performance among the beams being used is the outer beam in accordance with the current direction of the terminal.

For example, the beam of the terminal may be constructed as shown in FIG. 17. In this case, the $0^{th}$ beam may be a center beam, the $1^{st}$ to $6^{th}$ beams may be outer beams, and the $7^{th}$ to $18^{th}$ beams may be outermost beams. The center beam means a beam having the best antenna gain, and the outer beam (and the outermost beam) means a beam having low antenna gain as compared with the center beam. In this case, the reception strength of the $7^{th}$ to $18^{th}$ beams that are the outermost beams may be lower by about 6 dB than the reception strength of the $0^{th}$ beam that is the center beam. For example, the file download speeds of the terminal may have about 4 times differences.

In this case, the beam used by the terminal to receive the signal from the base station may be the $15^{th}$ beam. In this case, the terminal may identify that the currently used beam is the outer beam.

Further, at operation 1620, the terminal may estimate (calculate or measure) an azimuth difference and/or an elevation difference between the outer beams and the center beam. Here, because the terminal has already known the antenna beam direction and the antenna gain for the respective directions, it may know that the currently used beam is the outer beam. Further, the terminal may also know an angle difference between the currently used outer beam and the center beam. Further, the terminal may know the angle difference between the center beam and the currently used outer beams more accurately through estimation of the angle of the received signal. Further, the terminal may generate the optimum beam indication information 610 using the angle difference between the currently used outer beams and the center beam.

For example, it is assumed that the beam currently used by the terminal is the $15^{th}$ beam in a system using the beams as indicated in FIG. 17. In this case, the $0^{th}$ beam is the center beam, and the antenna gain of the $15^{th}$ beam in charge of 30° on the right side as compared with the $0^{th}$ beam may be lower than the antenna gain of the $0^{th}$ beam that is the center beam for about 6 dB. Accordingly, the optimum beam indication information 610 may be generated so as to adjust the terminal location as much as 30° that is the azimuth difference between the $0^{th}$ beam and the $15^{th}$ beam on the right side.

At operation 1640, the terminal may output the optimum beam indication information 610 generated as above. According to the example of FIG. 17, if the terminal direction is adjusted as much as 30° on the right side, the signal gain may be increased by 6 dB. Because the method for outputting the optimum beam indication information 610 has been described with reference to FIGS. 6 to 14, the detailed explanation thereof will be omitted.

Meanwhile, according to an embodiment, at operation 1630, the terminal may determine whether it is configured to output the optimum beam indication information 610. If it is not configured to output the optimum beam indication information 610, the terminal, at operation 1650, may not output the optimum beam indication information 610. Further, at operation 1630, if it is configured to output the optimum beam indication information 610 as the result of the determination, the terminal, at operation 1640, may output the optimum beam indication information 610.

Further, according to an embodiment, after operation 1640, the terminal may adjust the direction of the antenna 115 to the optimum beam direction through the mechanical tilt.

Figure 18:
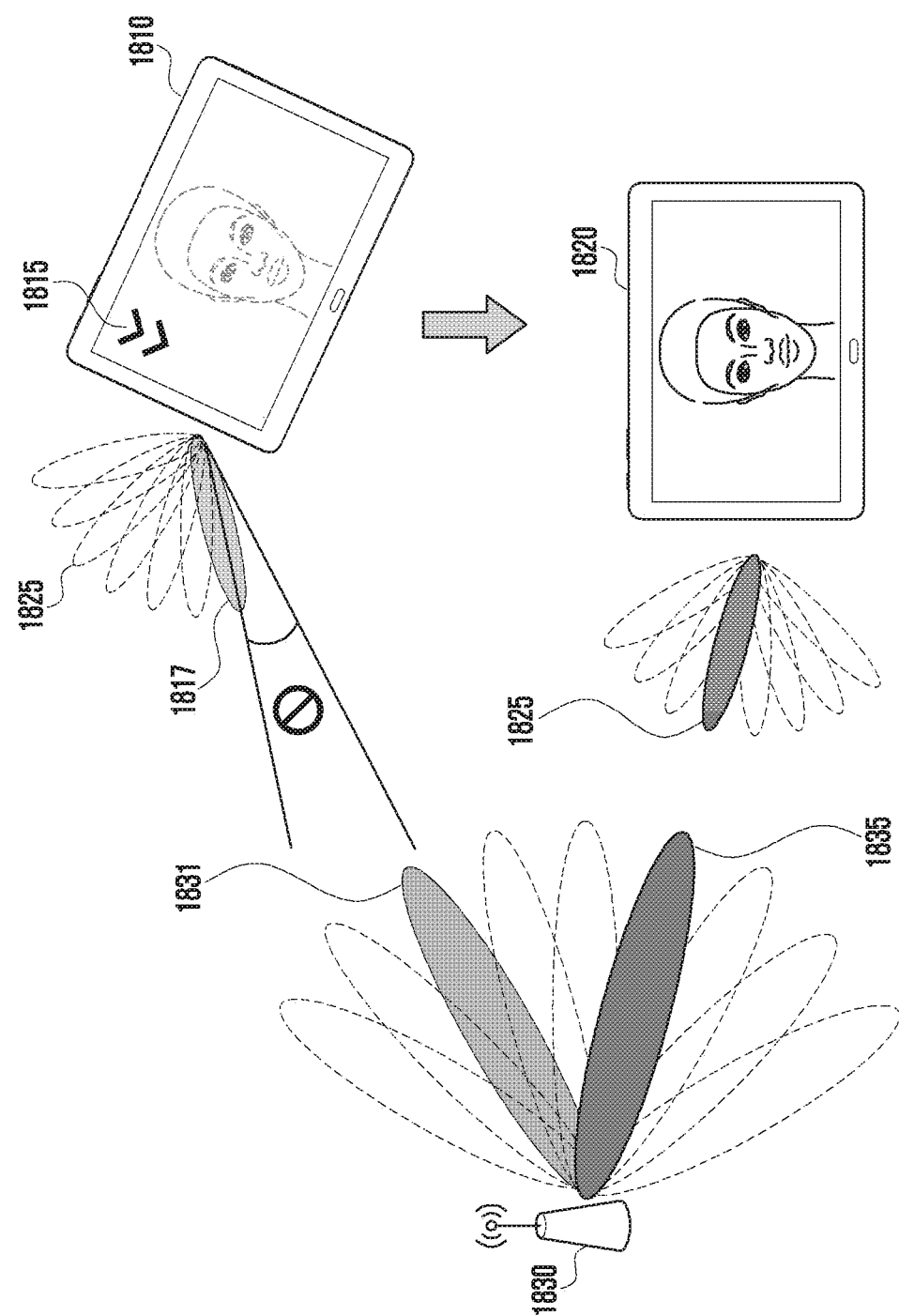
FIG. 18 is a diagram explaining a terminal operation in the case of deviating from a beam search range.
Figure 19:
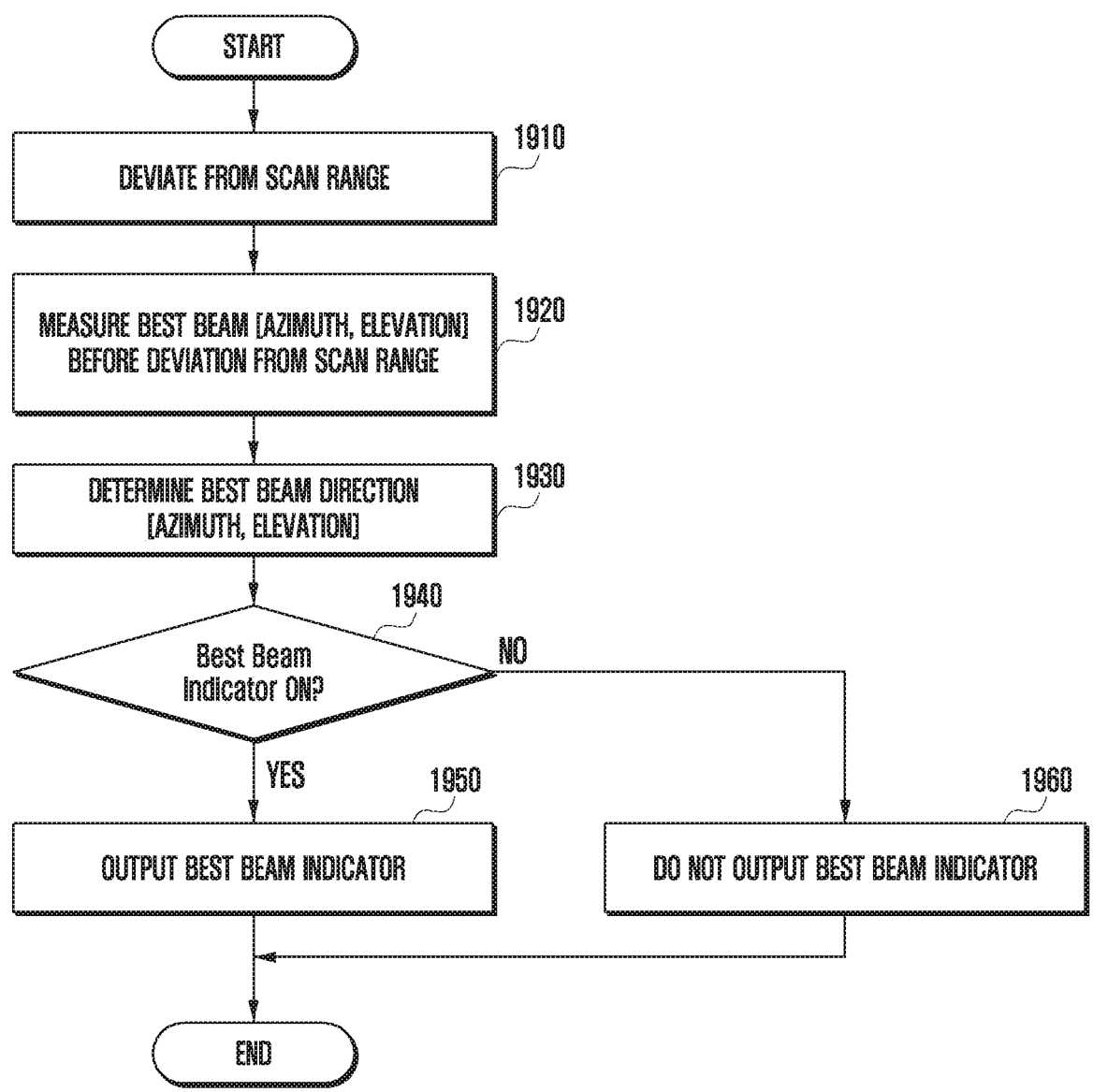
FIG. 19 is a diagram illustrating an example of an optimum beam guidance method in the case of deviating from a beam search range according to an embodiment of the disclosure.

FIG. 18 is a diagram explaining a terminal operation in the case of deviating from a beam search range, and FIG. 19 is a diagram illustrating an example of an optimum beam guidance method in the case of deviating from a beam search range according to an embodiment of the disclosure.

With reference to FIG. 19, at operation 1910, the terminal may recognize that another network entity (e.g., base station) deviates from the beam scan range of the terminal. For example, with reference to FIG. 18, in a state of 1810, the beam 1831 of the base station 1830 may deviate from the outermost beam 1817 in the beam scan range of the terminal. In this case, the signal may not be received in the terminal 1810.

In this case, at operation 1920, the terminal 1810 may estimate the azimuth and/or elevation of the optimum beam before deviating from the beam scan range. Further, at operation 1930, the terminal may determine the optimum beam indication information 610 using the estimated value (and current direction of the terminal). That is, the terminal 1810 may store history information on the azimuth and/or elevation of the optimum beam before deviating from the beam scan range. Further, in the case where the terminal 1810 deviates from the beam scan range, the terminal 1810 may determine the optimum beam indication information 610 using the azimuth and/or elevation of the optimum beam stored in the history information. For example, the terminal at a state of 1810 may store existence of the optimum beam in the leftward direction of the terminal before deviating from the beam scan range. Further, the terminal may also store information on the azimuth and/or elevation of the optimum beam. Accordingly, the terminal may determine the optimum beam indication information 610 by calculating information on the rotating direction and the rotation amount of the terminal whereby the signal strength is heightened.

Further, at operation 1950, the terminal 1810 may display (1815) the optimum beam indication information 610 on the display of the terminal. Accordingly, if the user rotates the direction of the terminal 1810, the state of the terminal may be changed to a state of 1820. In this case, the beam 1825 to be used by the terminal in the state of 1820 coincides with the beam 1835 in the beam scan range of the base station 1830, and thus the terminal can receive a strong signal.

According to an embodiment, in order to receive the strongest signal from the base station, the terminal may determine the optimum beam indication information 610 so that the center beam 1825 among the beams of the terminal coincides with the beam 1835 of the base station. For example, the terminal in the state of 1810 may determine a location adjustment value of the terminal by calculating the azimuth difference and/or elevation difference between the center beam 1825 of the terminal itself and the transmission beam of the base station 1830. Further, the terminal may output the optimum beam indication information 610 in accordance with the determined location adjustment value.

Further, according to an embodiment, in order to acquire the optimum beam at operations 1920 and 1930, the terminal may calculate only information on the direction in which the terminal should be rotated. Further, the terminal may output only the information on the direction. Thereafter, if the base station enters into the beam scan range of the terminal, an accurate adjustment location of the terminal may be determined using the optimum beam guidance method in the beam scan range as described above with reference to FIGS. 16 and 17.

On the other hand, according to an embodiment, after operation 1950, the terminal 1810 may adjust the direction of the antenna 115 to the optimum beam direction through the mechanical tilt.

Figure 20:
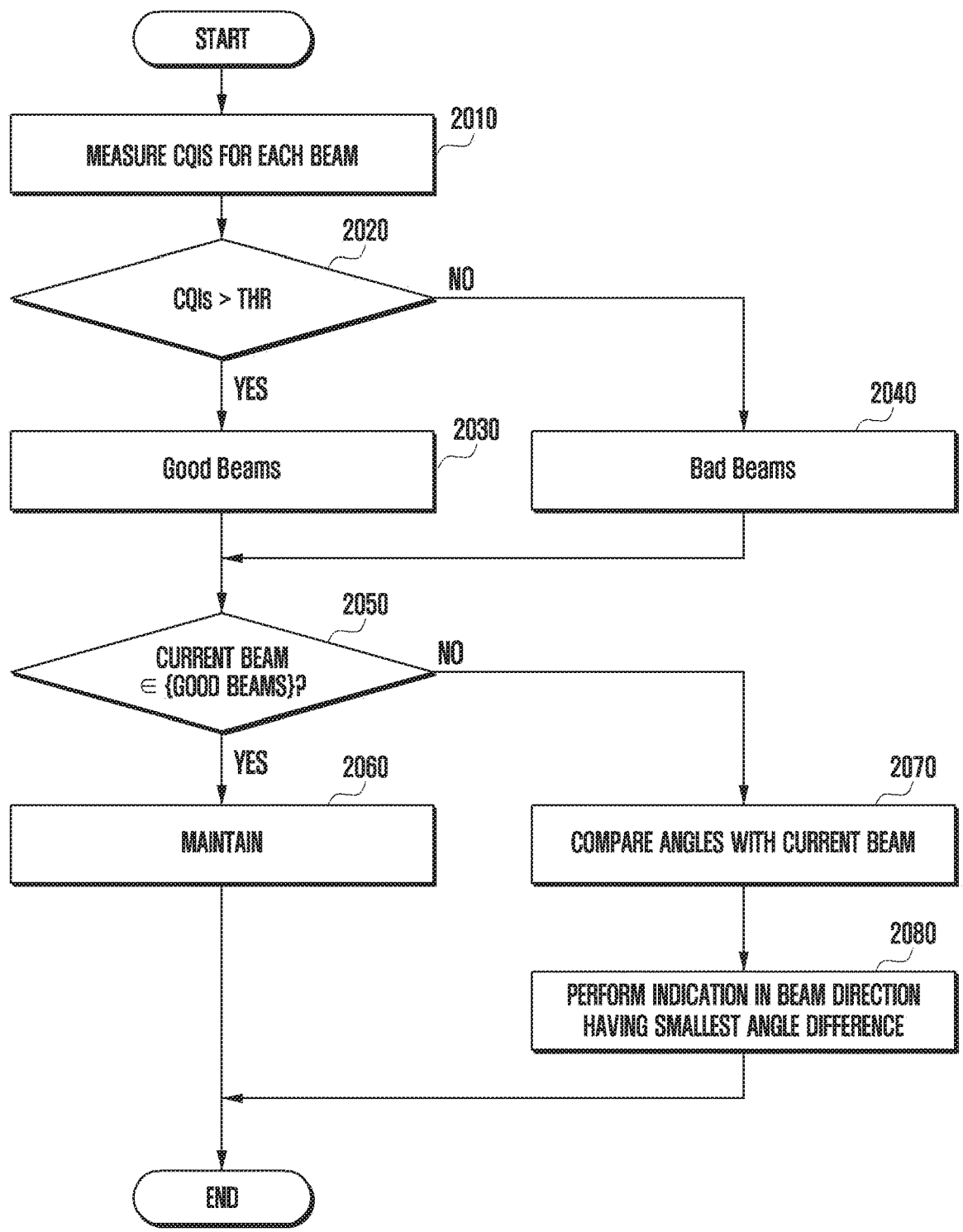
FIG. 20 is a diagram illustrating an example of a beam grouping method according to an embodiment of the disclosure.

FIG. 20 is a diagram illustrating an example of a beam grouping method according to an embodiment of the disclosure.

If the terminal frequently outputs the optimum beam indication information 610, it may cause an excessive intervention of the user for the location adjustment of the terminal. In this case, in order to prevent such excessively frequent outputs of the optimum beam indication information 610, the terminal may not output internal changes of good beams by grouping the good beams based on a threshold value.

With reference to FIG. 20, the terminal, at operation 2010, may measure the reception strength for each beam. For example, the terminal may measure a channel quality index (CQI) for each beam.

Further, the terminal may determine whether the measured reception strength for each beam is equal to or larger than a predetermined threshold value. Meanwhile, the threshold value may be configured in accordance with the quality of service (QoS) level of the service.

For this, at operation 2020, the terminal may determine whether the CQI for each beam is larger (or equal to or larger) than the predetermined threshold value THR. Further, in the case of the beam of which the CQI is larger than the predetermined threshold value, the terminal, at operation 2030, may classify the beam into a good beam. Further, if the CQI is equal to or smaller than the predetermined threshold value, the terminal, at operation 2040, may classify the beam into a bad beam.

Meanwhile, although in the drawing, it is exemplified that the beam is divided into two beams of a good beam and a bad beam, but the beam division is not limited thereto, and the beams may be grouped into three or more groups. For example, the terminal may divide the beams into a first group in the best reception state, a second group in a middle reception state, and a third group in a bad reception state using two threshold values including the first threshold value and the second threshold value.

Thereafter, at operation 2050, the terminal may determine whether the beam currently used by the terminal is included in a good beam set. Further, if the currently used beam is included in the good beam set, the terminal, at operation 2060, may maintain the current state. That is, the terminal may not output the optimum beam indication information 610.

Further, if the beam currently used by the terminal is not included in the goo beam set as the result of the determination at operation 2050, the terminal, at operation 2070, may calculate the angle between the beam currently used by the terminal and the optimum beam. That is, the terminal may calculate the azimuth difference and/or the elevation difference between the currently used beam and the center beam. Further, the terminal may generate and output the optimum beam indication information 610 using the angle difference between the currently used beam and the center beam.

Meanwhile, according to an embodiment, the terminal, at operation 2070, may calculate the angle difference between the current beam and good beams belonging to the good beam set. Further, in order to minimize the user's movement, the terminal, at operation 2080, may select the beam having the smallest angle difference with the current beam among the good beams. Further, the terminal may determine and output the optimum beam indication information 610 including information on the selected optimum beam. Meanwhile, according to an embodiment, after operation 2080, the terminal may adjust the direction of the antenna 115 to the optimum beam direction through the mechanical tilt.

With reference to FIG. 17, the terminal may measure the reception performance of the $0^{th}$ to $18^{th}$ beams. In this case, the terminal may determine whether the reception performance of the beam is better than the threshold value through comparison of the reception performance of each beam with the predetermined threshold value. For example, the $0^{th}$ to $6^{th}$ beams may be beams having better reception performance than the threshold value. Further, the $7^{th}$ to $18^{th}$ beams may be beams having worse reception performance than the threshold value. Accordingly, the terminal may group the $0^{th}$ to $6^{th}$ beams into a good beam group. Further, the terminal may group the $7^{th}$ to $18^{th}$ beams into a bad beam group.

In this case, if the beam used by the terminal is one of the $0^{th}$ to $6^{th}$ good beams, the terminal may not output the optimum beam indication information 610. In contrast, the beam currently used by the terminal may be, for example, the $15^{th}$ beam. In this case, because the $15^{th}$ beam does not belong to the good beam group, the terminal may calculate the angle difference between the good beams (i.e., $0^{th}$ to $6^{th}$ beams) and the $15^{th}$ beam. In this case, because the angle difference between the $15^{th}$ beam and the $3^{rd}$ beam is the smallest, the terminal may select the $3^{rd}$ beam as the optimum beam of the terminal. Further, the terminal may output the optimum beam indication information 610 for adjusting the direction of the terminal to the 3rd beam direction.

Further, according to an embodiment, the terminal may select the $0^{th}$ beam having the best signal strength as the optimum beam. Further, the terminal may output the optimum beam indication information 610 for adjusting the direction of the terminal to the $0^{th}$ beam direction.

As described above, the terminal according to an embodiment of the disclosure may provide an algorithm for selecting the optimum beam based on a beam book. Further, the terminal may provide respective optimization algorithms inside and outside the scan range, and it may minimize the optimum beam indication information output through the optimum beam grouping to minimize the user's intervention.

The above-described operations of the base station or the terminal can be realized by providing a memory device storing therein corresponding program codes in a certain constituent part in the base station or the terminal device. That is, the controller of the base station or the terminal device can execute the above-described operations by reading and executing the program codes stored in the memory device through a processor or a central processing unit (CPU).

Various constituent parts of the entity, the base station, or the terminal device as described above and modules can operate using hardware circuits, for example, a complementary metal oxide semiconductor based logic circuit, firmware, software, and/or hardware and firmware and/or software combination inserted in a machine readable medium. As an example, various electric structures and methods can be embodied using transistors, logic gates, and electric circuits such as application specific integrated circuits (ASIC).

Embodiments disclosed in this specification and drawings are illustrated to present only specific examples in order to clarify the technical contents and help understanding of the disclosure, but are not intended to limit the scope of the disclosure. It will be evident to those skilled in the art that various implementations based on the technical idea of the disclosure are possible in addition to the disclosed embodiments.

Meanwhile, preferred embodiments of the disclosure disclosed in this specification and drawings and specific terms used therein are illustrated to present only specific examples in order to clarify the technical contents of the disclosure and help understanding of the disclosure, but are not intended to limit the scope of the disclosure. It will be evident to those skilled in the art that various modifications based on the technical spirit of the disclosure are possible in addition to the disclosed embodiments.

The invention claimed is:

1. A control method by a terminal, comprising:
   determining whether a center beam having a best antenna gain among a plurality of beams of the terminal is substantially identical to a currently used beam of the terminal;
   determining an angle between the currently used beam of the terminal and the center beam, in case that the currently used beam of the terminal and the center beam are not substantially identical to each other; and
   outputting information indicating an optimum beam direction in accordance with the angle between the currently used beam of the terminal and the center beam.

2. The control method of claim 1, wherein the outputting of the information indicating the optimum beam direction comprises outputting the information indicating the optimum beam direction, in case that it is configured to output the information indicating the optimum beam direction.

3. The control method of claim 1, wherein the angle between the currently used beam of the terminal and the center beam comprises at least one of an azimuth difference between the currently used beam of the terminal and the center beam, or an elevation difference between the currently used beam of the terminal and the center beam.

4. The control method of claim 1, further comprising:
   estimating the optimum beam direction before a network entity performing communication with the terminal deviates from a beam search range, in case that the network entity is in a state where the network entity deviates from the beam search range;
   determining a rotation direction and an angle of the terminal using the optimum beam direction before the network entity deviates from the beam search range; and
   outputting the information indicating the optimum beam direction in accordance with the rotation direction and the angle of the terminal.

5. The control method of claim 1, wherein the determining of the angle between the currently used beam of the terminal and the center beam comprises:
   configuring beams having signal strengths higher than a predetermined threshold value among the plurality of beams of the terminal as a beam group;
   determining whether the currently used beam of the terminal is included in the beam group; and
   determining the angle between the currently used beam of the terminal and the center beam in case that the currently used beam of the terminal is not included in the beam group.

6. The control method of claim 5, wherein the determining of the angle between the currently used beam of the terminal and the center beam comprises:
   determining angle differences between the currently used beam of the terminal and the beams belonging to the beam group in case that the currently used beam of the terminal is not included in the beam group;

selecting a beam having a smallest angle difference with the currently used beam of the terminal among the beams belonging to the beam group as an optimum beam; and determining the angle between the currently used beam of the terminal and the optimum beam as the angle between the currently used beam and the center beam of the terminal.

7. The control method of claim 1, wherein the information indicating the optimum beam direction comprises at least one of information indicating a direction in which the terminal is to be rotated, information indicating an angle at which the terminal is to be rotated, or an indication line indicating the optimum beam direction.

8. A terminal comprising:

a transceiver configured to transmit and receive signals and including a plurality of beams of the terminal; and at least one processor configured to:
   determine whether a center beam having a best antenna gain among the plurality of beams of the terminal is substantially identical to a currently used beam of the terminal, determine an angle between the currently used beam of the terminal and the center beam in case that the currently used beam of the terminal and the center beam are not substantially identical to each other, and output information indicating an optimum beam direction in accordance with the angle between the currently used beam of the terminal and the center beam.

9. The terminal of claim 8, wherein the at least one processor is further configured to output the information indicating the optimum beam direction in case that it is configured to output the information indicating the optimum beam direction.

10. The terminal of claim 8, wherein the angle between the currently used beam of the terminal and the center beam comprises at least one of an azimuth difference between the currently used beam of the terminal and the center beam, or an elevation difference between the currently used beam of the terminal and the center beam.

11. The terminal of claim 8, wherein the at least one processor is further configured to:

estimate the optimum beam direction before a network entity performing communication with the terminal deviates from a beam search range in case that the network entity is in a state where the network entity deviates from the beam search range, determine a rotation direction and an angle of the terminal using the optimum beam direction before the network entity deviates from the beam search range, and output the information indicating the optimum beam direction in accordance with the rotation direction and the angle of the terminal.

12. The terminal of claim 8, wherein the at least one processor is further configured to:

configure beams having signal strengths higher than a predetermined threshold value among the plurality of beams of the terminal as a beam group, determine whether the currently used beam of the terminal is included in the beam group, and determine the angle between the currently used beam of the terminal and the center beam in case that the currently used beam of the terminal is not included in the beam group.

13. The terminal of claim 12, wherein the at least one processor is further configured to:

determine angle differences between the currently used beam of the terminal and the beams belonging to the beam group in case that the currently used beam of the terminal is not included in the beam group, select a beam having a smallest angle difference with the currently used beam of the terminal among the beams belonging to the beam group as an optimum beam, and determine the angle between the currently used beam of the terminal and the optimum beam as the angle between the currently used beam and the center beam of the terminal.

14. The terminal of claim 8, wherein the information indicating the optimum beam direction comprises at least one of information indicating a direction in which the terminal is to be rotated, information indicating an angle at which the terminal is to be rotated, or an indication line indicating the optimum beam direction.

15. The terminal of claim 8, further comprising:

an antenna connected to the transceiver and configured to transmit and receive the signals; and an antenna direction adjuster connected to the antenna, wherein the at least one processor is further configured to control the antenna direction adjuster to adjust a direction of the antenna to the optimum beam direction.

* * * * *